US008208050B2

(12) United States Patent
Sasaki

(10) Patent No.: US 8,208,050 B2
(45) Date of Patent: Jun. 26, 2012

(54) IMAGE PROCESSOR FOR PERFORMING PREDETERMINED IMAGE PROCESSING IN ACCORDANCE WITH COLOR SELECTION TIMING SIGNAL

(75) Inventor: Gen Sasaki, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 945 days.

(21) Appl. No.: 11/627,663

(22) Filed: Jan. 26, 2007

(65) Prior Publication Data

US 2007/0177026 A1 Aug. 2, 2007

(30) Foreign Application Priority Data

Jan. 27, 2006 (JP) ................................ 2006-018764

(51) Int. Cl.
*H04N 3/14* (2006.01)
*H04N 5/335* (2011.01)

(52) U.S. Cl. ........ 348/294; 348/299; 348/302; 348/308; 348/312

(58) Field of Classification Search .......... 348/294–324; 257/290–292; 250/208.1
See application file for complete search history.

(56) References Cited

U.S. PATENT DOCUMENTS 5,229,848 A * 7/1993 Sugasawa ..................... 348/264
5,587,746 A * 12/1996 Nakakuki ..................... 348/708
6,507,011 B2 * 1/2003 Ang ........................... 250/208.1
7,399,952 B2 7/2008 Kinoshita
7,457,014 B2 11/2008 Sasaki
2004/0174568 A1 * 9/2004 Murakami ..................... 358/2.1
2004/0257453 A1 12/2004 Lee et al.

FOREIGN PATENT DOCUMENTS

JP 2004-304460 10/2004
JP 2005-20689 1/2005
JP 2007-20108 1/2007
JP 2007-36774 2/2007

OTHER PUBLICATIONS

Office Action issued Jan. 11, 2011, in Japanese Patent Application No. 2006-018764 with partial English translation.

* cited by examiner

*Primary Examiner* — Yogesh Aggarwal
(74) *Attorney, Agent, or Firm* — Oblon, Spivak, McClelland, Maier & Neustadt, L.L.P.

(57) ABSTRACT

The least significant bits of respective count values of an H counter and a V counter are combined, to generate a timing signal defining a 2×2-size repeat block. A timing register including four registers each storing data which determines a color of each location within the repeat block is provided for each of input channels. A selector selects one of outputs of the timing registers based on the timing signal, and generates a signal designating a color of a pixel at a certain time for each of the input channels. A register storing black level correction data for each color is used in common by the input channels. For each of the input channels, an item of black level correction data at the certain time is selected based on the signal designating the color of the pixel at the certain time and input to a pre-processing circuit in each of the input channels.

27 Claims, 26 Drawing Sheets

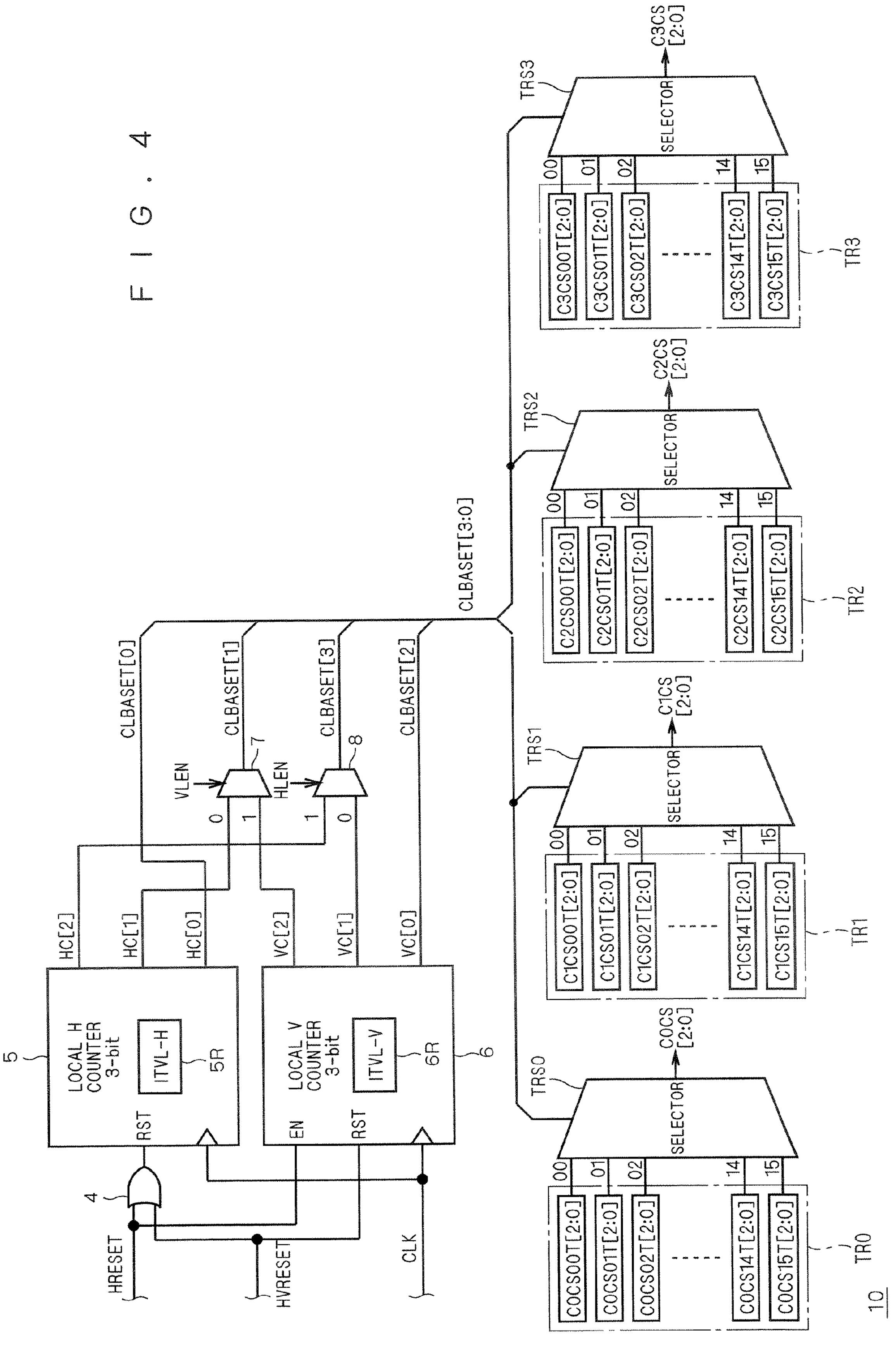
F I G . 4

F I G . 5
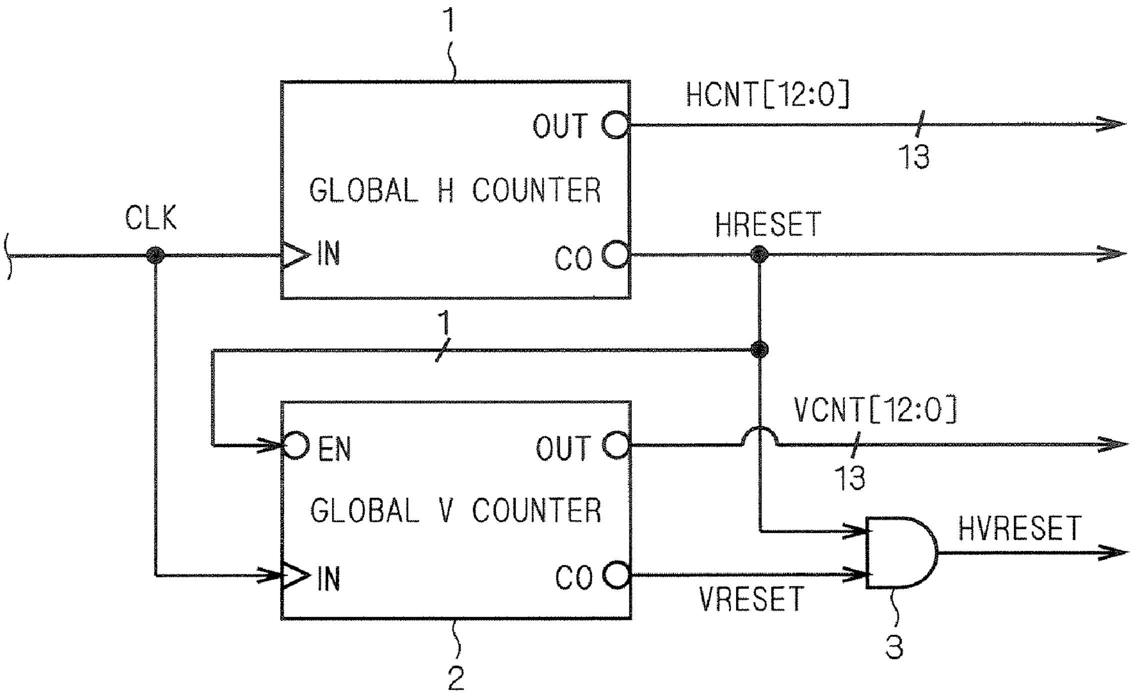

ITVL-H: 2
ITVL-V: 2

REPEAT BLOCK: 3×3

ITVL-H: 2
ITVL-V: 3

REPEAT BLOCK: 3×4

Timing(CxCSxxT) Arrangement

FIG. 7A VLEN,HLEN=0,0:H4max,V4max cyclic

| | | | |
|---|---|---|---|
| 00 | 01 | 02 | 03 |
| 04 | 05 | 06 | 07 |
| 08 | 09 | 10 | 11 |
| 12 | 13 | 14 | 15 |

FIG. 7B VLEN,HLEN=0,1:H8max,V2max cyclic

| | | | | | | | |
|---|---|---|---|---|---|---|---|
| 00 | 01 | 02 | 03 | 08 | 09 | 10 | 11 |
| 04 | 05 | 06 | 07 | 12 | 13 | 14 | 15 |

FIG. 7C VLEN,HLEN=1,0:H2max,V8max cyclic

| | |
|---|---|
| 00 | 01 |
| 04 | 05 |
| 08 | 09 |
| 12 | 13 |
| 02 | 03 |
| 06 | 07 |
| 10 | 11 |
| 14 | 15 |

F I G . 8
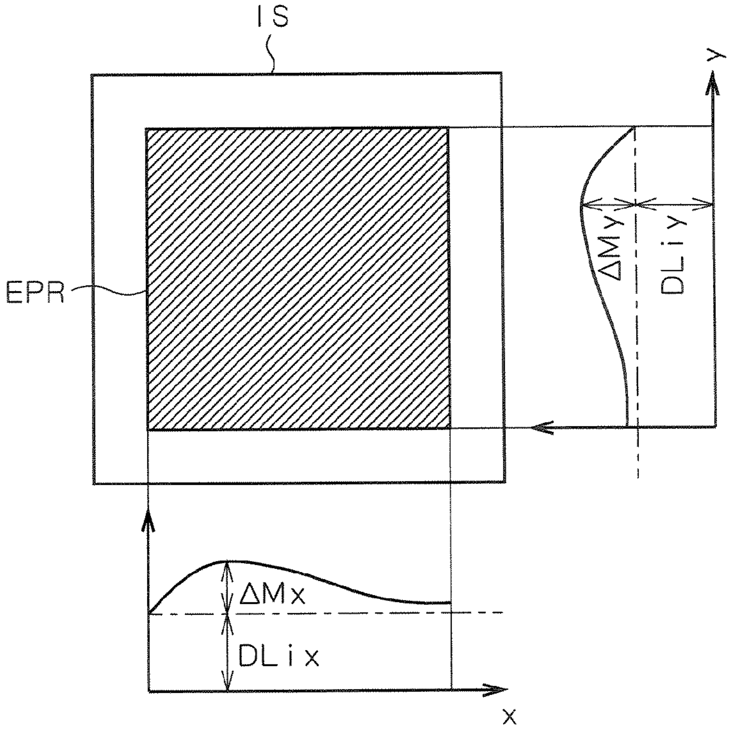
F I G . 9
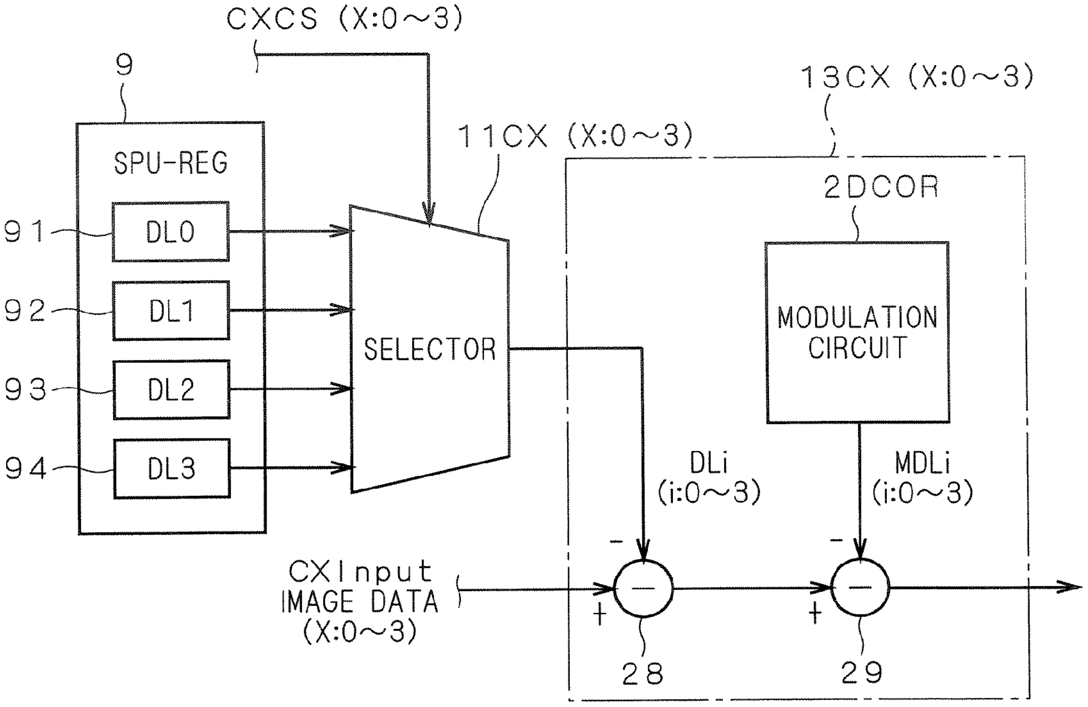

F I G . 1 0
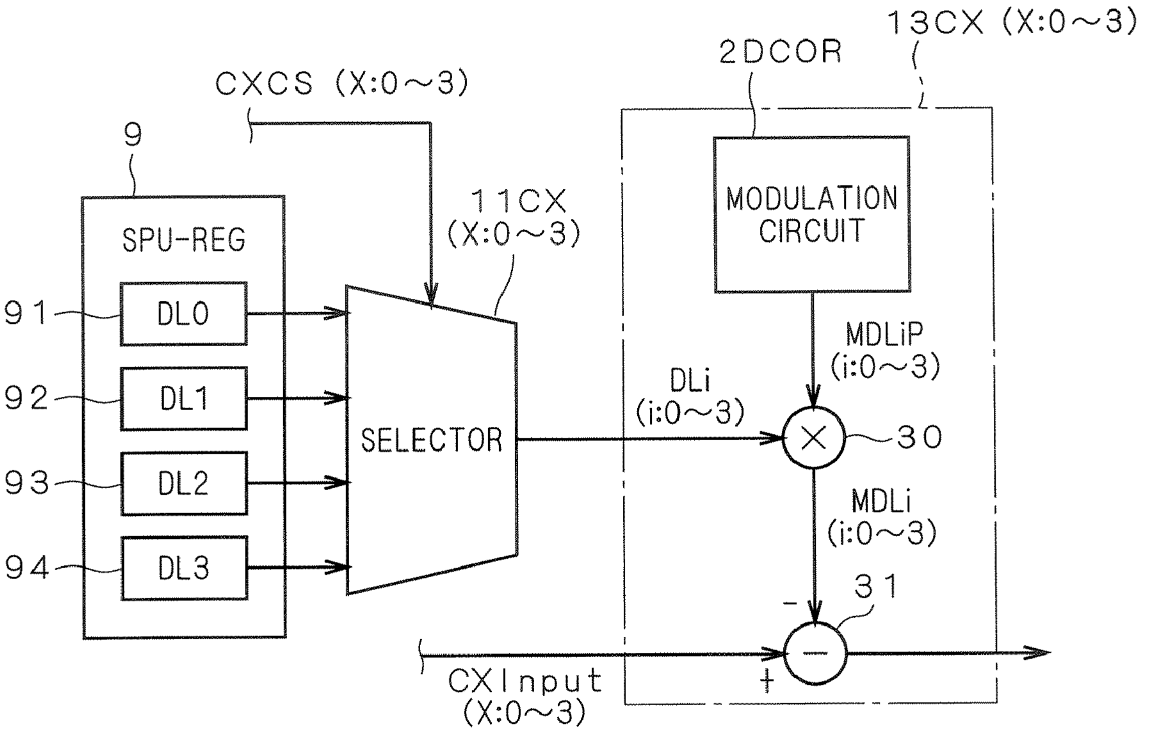

P(00),P(01),P(10),P(11) : BLACK LEVEL MODULATION DATA
P(X,Y) : INTERPOLATED MODULATION DATA AT PIXEL LOCATION (X, Y)

M2DR[2:0][2:0]:Unsigned 12-bit*2D Modulation value
M2DHCOF:*Horizontal Counter Offset
M2DVCOF:*Vertical Counter Offset
M2DRES:Unsigned 12-bit*Calculated Result F I G. 1 7
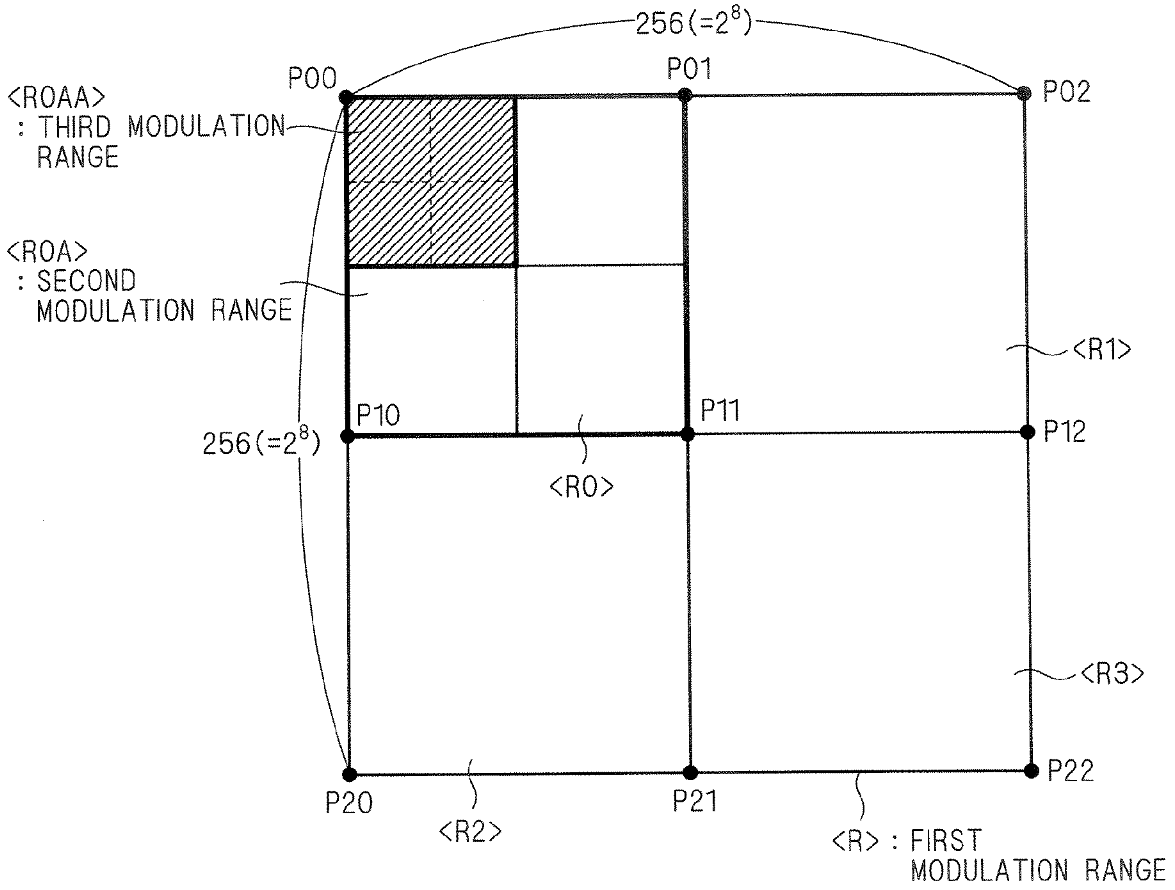

F I G . 2 0
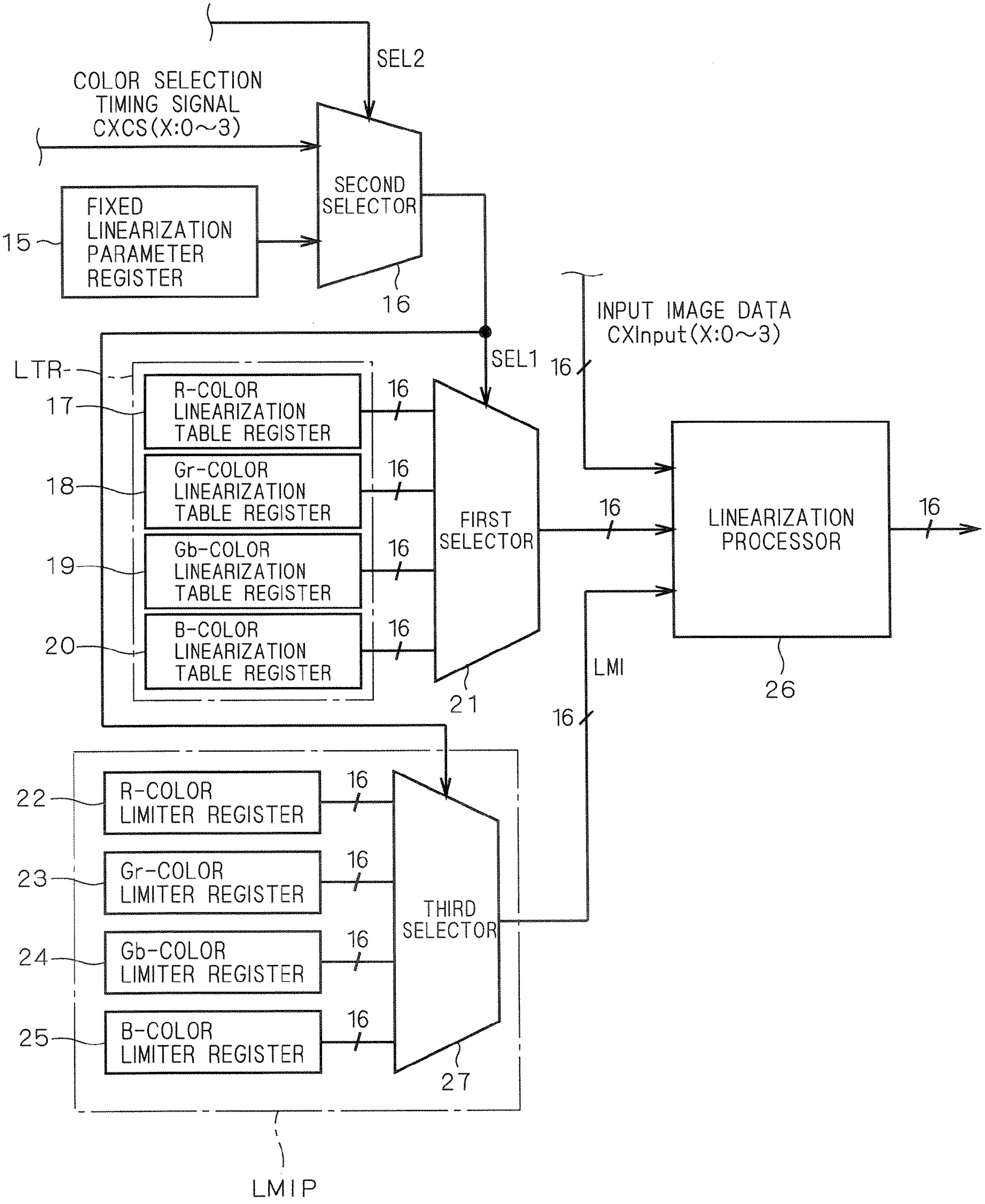

F I G . 2 5
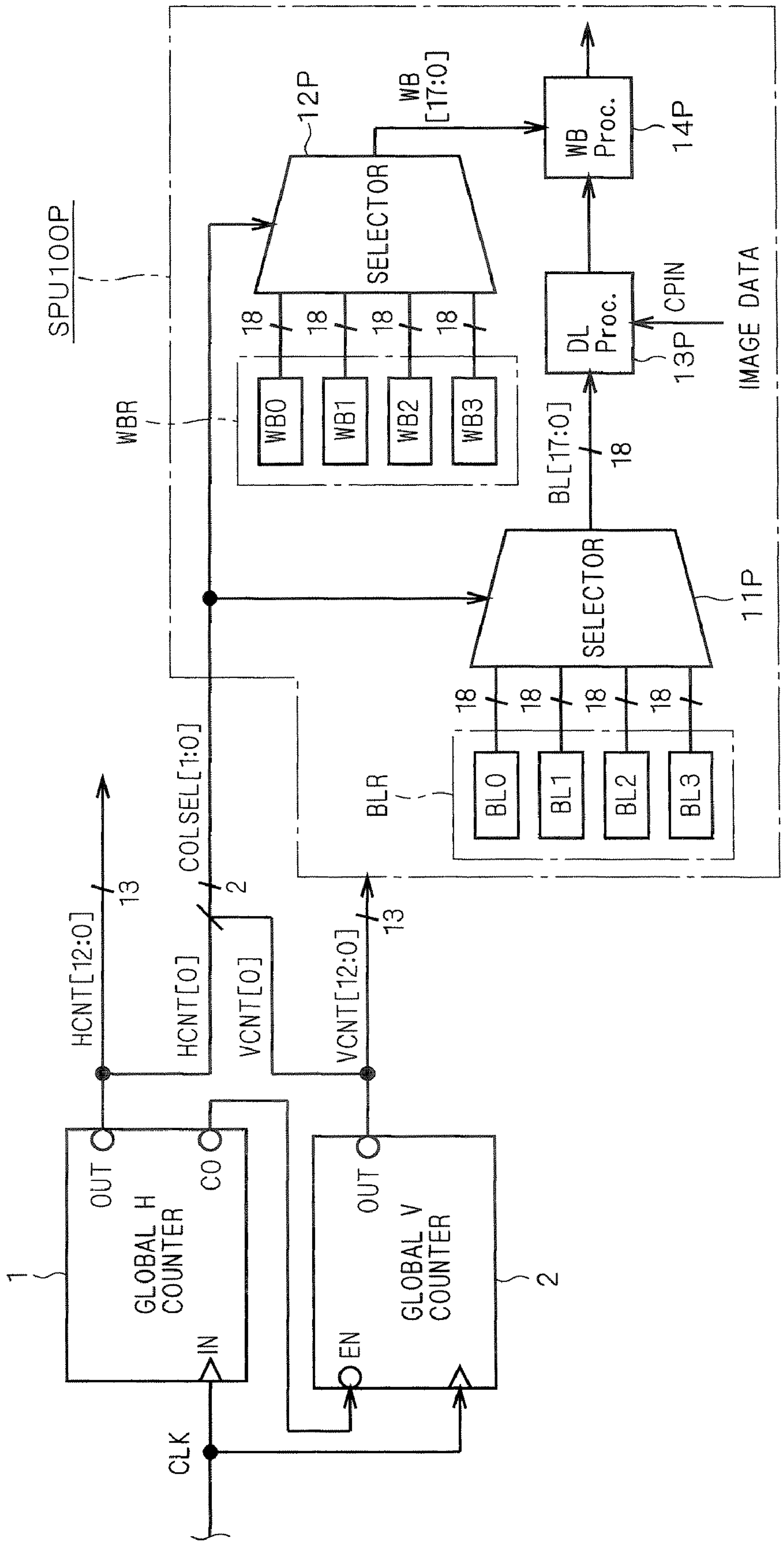

FIG. 26A
FIG. 26B
FIG. 26C
FIG. 26D
FIG. 26E
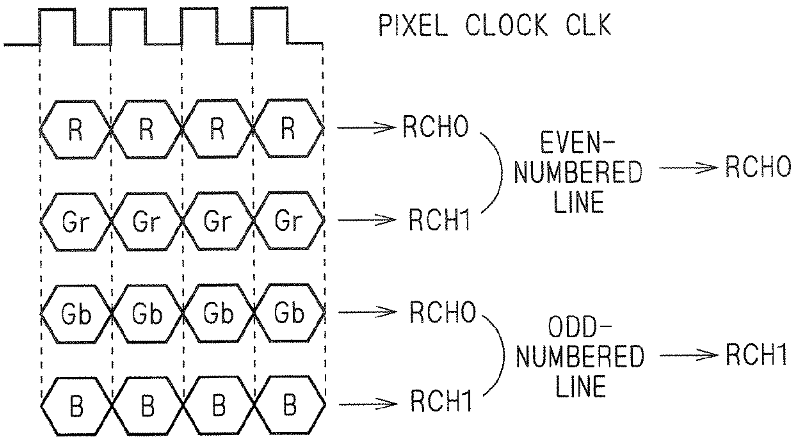
FIRST IMAGE DATA READOUT PATTEN
FIG. 27A
FIG. 27B
FIG. 27C
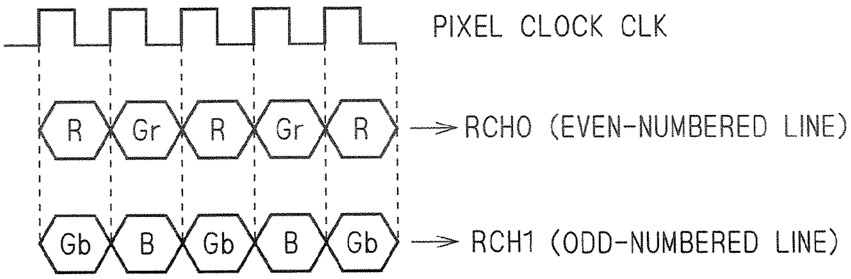
SECOND IMAGE DATA READOUT PATTERN

THIRD IMAGE DATA READOUT PATTERN

IMAGE PROCESSOR FOR PERFORMING PREDETERMINED IMAGE PROCESSING IN ACCORDANCE WITH COLOR SELECTION TIMING SIGNAL

BACKGROUND OF THE INVENTION

1. Field of the Invention

The present invention relates to an image processor for applying correction (such as black level correction and white balance correction) which are typically required in an image sensor including a plurality of channels for reading out image data ("image data readout channels").

2. Description of the Background Art

FIG. 23 is a block diagram schematically illustrating a configuration of an image processing LSI for a digital (still or video) camera according to the conventional arts. In the conventional image processing LSI illustrated in FIG. 23, only a single channel RCH0 for reading out image data is provided in an image sensor PIS, so that respective items of image data in a plurality of pixels are sequentially subjected to raster scanning to be read out. Meanwhile, an array of color filters (an order in which colors are put) respectively provided on a plurality of pixels placed in an effective pixel region of the image sensor PIS is in a so-called RGB Bayer pattern.

Each of the items of image data which are sequentially read out from the image sensor PIS in accordance with pixel clocks (not illustrated) is subjected to A/D conversion in an A/D converter 300P, first, and then is input to an image sensor data pre-processing unit (which will be hereinafter referred to as an "SPU" (abbreviation of "sensor processing unit")) 100P which is placed on a C-MOS LSI. The SPU 100P is not a circuit for performing substantial image processing, but a unit for performing processes which are required due to problems typical of the image sensor PIS, that is, black level correction, while balance correction, and defective pixel correction, on the image data input from the image sensor PIS, to normalize a signal provided by each of the pixels with color filters which are arranged in an RGB Bayer pattern (which signal will hereinafter be referred to as an "RGB Bayer signal").

FIGS. 24A, 24B, and 24C schematically illustrate normalization of an RGB Bayer signal input from the image sensor PIS. FIGS. 24A, 24B, and 24C will be adopted in a first preferred embodiment of the present invention which will be later described. A relationship between an output value and brightness of each of color signals of a red (R) color signal, a green (G) signal, and a blue (B) signal shown in FIG. 24A is assumed to be linear, and the respective color signals are subjected to black level correction, so that respective original points thereof are aligned to one another (refer to FIG. 24B). Further, respective color signals are subjected to white balance correction, so that the color signals are normalized with respective characteristic lines thereof overlapping one another (refer to FIG. 24C).

The normalized RGB Bayer signal is then input to an RPU 200P, where substantial image processing such as gamma correction is performed on the normalized RGB Bayer signal.

FIG. 25 is a block diagram schematically illustrating a configuration of a principal portion of the SPU 100P according to the conventional arts. Referring to FIG. 25, a global H counter 1 is a global horizontal counter which receives pixel clocks CLK as input signals and counts the number of times of reception of the input signals to generate a count value HCNT, to thereby make or control a timing for horizontally reading out image data supplied from the image sensor PIS. Also, a global V counter 2 is a global vertical counter which counts the number of times of reception of a reset signal output from a carry-out terminal CO of the global H counter 1 to provide a count value VCNT and increments the count value VCNT one by one each time the reset signal is received in synchronization with the pixel clocks CLK, to thereby make or control a timing for vertically reading out image data supplied from the image sensor PIS. It is additionally noted that both the counters 1 and 2 are elements which are also employed in the first preferred embodiment of the present invention which will be later described. For the SPU 100P, it is sufficient that a 2×2-size repeat block of a timing signal for reading out correction data is provided in a color filter array in an RGB Bayer pattern (which will hereinafter be referred to an "RGB Bayer array") because the image sensor PIS includes only a single readout channel. Accordingly, combining the least significant bit HCNT(0) of the count value HCNT of the global H counter 1 and the least significant bit VCNT(0) of the count value VCNT of the global V counter 2 results in generation of a 2-bit color selection timing signal COLSEL. Also, a black level correction value register BLR storing a correction value used for black level correction is previously provided in the SPU 100P. The black level correction value register BLR includes registers BL0, BL1, BL2, and BL3 which store respective black level correction values at four locations in the above-mentioned 2×2-size repeat block to which respective colors (four colors in all) in an RGB Bayer array are allocated. More specifically, the register BL0 stores a black level correction value for R color which is allocated to a location "00" in the repeat block. The register BL1 stores a black level correction value for Gr color which is allocated to a location "01" in the repeat block. The register BL2 stores a black level correction value for Gb color is allocated to a location "10" in the repeat block. The register BL3 stores a black level correction value for B color which is allocated to a location "11" in the repeat block. Likewise, a white balance correction value register WBR storing a correction value used for white balance correction is provided in the SPU 100P. Regarding the SPU 100P, it is particularly notable that both a black level correction value and a white balance correction value at each location and for each color are selected directly by the color selection timing signal COLSEL via selectors 11P and 12P, respectively, as illustrated in FIG. 25. Additionally, reference numerals 13P and 14P in FIG. 25 denote a black level corrector and a white balance corrector, respectively.

<First Problem>

In an effort to generate a higher definition image, there is an increasing demand for an increase in resolution of an image sensor (such as a CCD sensor or a CMOS sensor), that is, an increase in the number of pixels in an image sensor. In order to satisfy the foregoing demand, an image sensor including 8M or more pixels, or 10M or more pixels, has been recently put into practical use. Along with an increase in the number of pixels in an image sensor, manufacturers of a digital still camera who uses such a high resolution image sensor as mentioned above is now pursuing maintenance or further improvement of the number of frames per unit time, that is, a speed for continuous photographing. To this end, in a case where the number of pixels is 3M and a speed for continuous photographing is 10 frames per second, for example, a data rate or a rate of readout of image data is 30M pixels per second. Thus, in order to maintain the same speed for continuous photographing, if the number of pixels is 5M, a rate of readout of image data should be 50M pixels per second, if the number of pixels is 8M, a rate of readout of image data should be 80M pixels per second, and if the number of pixels is 10M, a rate of readout of image data should be as high as 100M pixels per second. Nonetheless, the highest operation speed of a CCD sensor is about 35 MHz, and the highest operation speed of a CMOS sensor is in a range from about 50 to 100 MHz. Also, an operation speed of a CMOS LSI is about 100 MHz. In order to form an image sensor at lower costs and with lower power consumption, it is desired that the highest operation speed of an image sensor is about 40 MHz. As such, so long as image data is readout from an image sensor using a single channel, it is impossible to maintain and accomplish a speed for continuous photographing which allows a rate of readout of image data to be 50M pixels per second or higher. In order to radically solve the above-described problem, it is required to increase the number of channels for reading out image data of an image sensor. To meet the foregoing requirement, the recent technologies have achieved implementation of an image sensor including a plurality of readout channels.

As a result of such increase in the number of readout channels as described above, a variety of patterns for reading out image data have been suggested and implemented. Then, a question of how to cope with such diversification of a pattern for reading out image data has been newly raised. In this regard, a brief discussion will be given below by taking a case in which the number of readout channels is two, as an example.

A pattern illustrated in FIGS. 26A to 26E can be thought of as an example of a pattern for reading out ("readout pattern") based on an RGB Bayer array in the case where the number of readout channels is two. In the readout pattern illustrated in FIGS. 26A to 26E, while only items of image data for R color which are provided in a given even-numbered line of an image sensor are read out via a first readout channel RCH0, only items of image data for Gr color which are provided in the given even-numbered line are read out via a second readout channel RCH1. Then, only items of image data for Gb color which are provided in a given odd-numbered line laid immediately under the given even-numbered line are read out via the first readout channel RCH0, and only items of image data for B color which are provided in the given odd-numbered line are read out via the second readout channel RCH1. Otherwise, in an alternative example, while only items of image data for R color and Gr color which are provided in a given even-numbered line of an image sensor are read out via the first readout channel RCH0, only items of image data for Gb color and B color which are provided in a given odd-numbered line laid immediately under the given even-numbered line are read out by the second readout channel RCH1.

A pattern illustrated in FIGS. 27A, 27B, and 27C can be thought of as another alternative example of a readout pattern based on an RGB Bayer array. Further, as still another alternative example, a readout pattern illustrated in FIG. 28 has been suggested and implemented. In the pattern illustrated in FIG. 28, an RGB Bayer array of an image sensor is divided into a rightward section and a leftward section with a boundary therebetween being set along a center line. Then, items of image data which are provided in a given line are sequentially read out, starting from the leftmost one, and at the same time, the items of image data in the given line are sequentially read out, starting from the rightmost one. Moreover, a readout pattern in which while vertical readout is performed in a given area of an RGB Bayer array of an image sensor, horizontal readout is performed in the remaining area, has been suggested.

As discussed above, such a variety of readout pattern as cited above have been suggested even for the case where the number of readout channels is two. At this rate, in a case where the number of readout channels is more than two, a readout pattern can be further diversified, so that the number of possible readout patterns is enormously increased.

As is made clear from the foregoing discussion, a wide variety of patterns for reading out image data from an image sensor is possible for each of manufacturers of an image sensor, or even for each of models of products offered by the same manufacturer. Accordingly, from a viewpoint of a designer or a manufacturer of a versatile LSI (image processor) for performing image processing on image data read out from an image sensor, there is a need of offering a highly versatile image processing LSI capable of coping with any readout pattern which may be employed in an image sensor utilized by a manufacturer of a digital still camera. To satisfy the foregoing need is a task which should be promptly tackled.

<Second Problem>

An increase in the number of pixels in an image sensor requires further reduction of a size of each of cells in the image sensor because an effective pixel region of the image sensor is unchanged, as described above. Such size reduction of each of cells in an image sensor involves relatively lowering a level of an output signal of each of the cells, to then impair linearity of the output signal of each of the cells. For this reason, a possibility of occurrence of cells having different characteristics depending on a location in an effective pixel region of an image sensor, or depending on a line of an image sensor, is increased. Hence, each of a black level correction value and a white balance correction value which are necessary for normalizing an RGB Bayer signal provided by each of pixels differs from location to location in an effective pixel region of an image sensor. Thus, there is a demand for techniques for correcting an RGB Bayer signal of each of pixels with high accuracy while overcoming the foregoing problem associated with size reduction of each of cells in an image sensor.

SUMMARY OF THE INVENTION

The present invention is intended to cope with the above-described problems. The first object of the present invention is to provide an image processor which overcomes the above-described first problem, and the second object of the present invention is to provide an image processor which overcomes the above-described second problem.

Features of the subject matter of the present invention reside in that an image processor includes: a plurality of pipelined image processor pre-processing units for receiving each of image signals which are read out in synchronization with one another via a plurality of image data readout channels included in an image sensor, respectively, using a plurality of input channels respectively connected with the plurality of image data readout channels, at each of pixel clocks, and performing predetermined image processing which is required due to a problem typical of the image sensor on input image data in parallel at each of the pixel clocks; and a color timing arrangement part for generating color selection timing signals which designate colors of pixels at a certain point in time respectively for the plurality of input channels of the plurality of image sensor pre-processing units and outputting the color selection timing signals which are respectively associated with the plurality of image sensor pre-processing units, to the plurality of image sensor pre-processing units, respectively, and that each of the plurality of image sensor pre-processing units performs the predetermined image processing in accordance with one of the color selection timing signals which is associated therewith.

According to the first aspect of the present invention, it is possible to provide an image processor for performing predetermined image processing which is typically required in an image sensor including a plurality of image data readout channels, while being capable of coping with various patterns for reading out image data from the image sensor.

According to a second aspect of the present invention, a color selection timing signal can be surely generated individually for each of input channels.

According to the third aspect of the present invention, a color selection timing signal can be generated in a pattern of local repeat blocks each with an arbitrary cycle.

According to the fourth aspect of the present invention, a repeat block of a color selection timing signal can be changed.

According to the fifth aspect of the present invention, a repeat block of a color selection timing signal is selectable from three types of combinations.

According to the sixth aspect of the present invention, a correction data register is provided outside each of image sensor pre-processing units and is used in common by the image sensor pre-processing units, so that the number of gates forming the register can be considerably reduced, to thereby lower power consumption as compared to a case where a correction data register is placed in each of the image sensor pre-processing units.

According to the seventh aspect of the present invention, non-linearity of a relationship between brightness of a color and an output value which is caused due to miniaturization of an image sensor can be corrected for each of input channels and for each of colors, whatever pattern may be employed for reading out data from an image sensor.

According to the eighth aspect of the present invention, not only non-linearity caused due to miniaturization of an image sensor, but also non-linearity caused due to the other factors such as circuitry on an output side of the image sensor, can be selectively corrected for each of input channels.

According to the ninth aspect of the present invention, linearization can be clipped for each of input channels and for each of colors.

According to the tenth aspect of the present invention, offset drift occurring in a black level signal all over an image plane of an image sensor can be reduced.

According to the eleventh aspect of the present invention, modulation data for black level correction data at each pixel location can be obtained by interpolation which can be accomplished relatively easily.

According to the twelfth aspect of the present invention, for black level correction, a division included in an arithmetic operation for interpolation can be handled as a division of a power of two which can be done by shifting, so that an increase in a scale of a circuit of an image processor manufactured as an LSI can be prevented.

According to the thirteenth aspect of the present invention, a physical area of a modulation range defined by a plurality of items of black level correction data which are discretely placed can be changed in accordance with a size of an effective pixel region of an image sensor, by selection of a bit of an output of each of two counters.

According to the fourteenth and fifteenth aspects of the present invention, a center of a modulation range can be caused to match a center of an effective pixel region of an image sensor.

According to the sixteenth aspect of the present invention, offset drift occurring in white balance all over an image plane of an image sensor can be reduced.

According to the seventeenth aspect of the present invention, modulation data for white balance correction data at each pixel location can be obtained by interpolation which can be accomplished relatively easily.

According to the eighteenth aspect of the present invention, for white balance correction, a division included in an arithmetic operation for interpolation can be handled as a division of a power of two which can be done by shifting, so that an increase in a scale of a circuit of an image processor manufactured as an LSI can be prevented.

According to the nineteenth aspect of the present invention, a physical area of a modulation range defined by a plurality of items of white balance modulation data which are discretely placed can be changed in accordance with a size of an effective pixel region of an image sensor, by selection of a bit of an output of each of two counters.

According to the twentieth and twenty-first aspects of the present invention, a center of a modulation range for a white balance gain can caused to match a center of an effective pixel region of the image sensor.

According to the twenty-second aspect of the present invention, drift occurring in correction of tailing all over an image plane of an image sensor can be reduced.

According to the twenty-third aspect of the present invention, a modulated correction gain at each pixel location can be obtained by interpolation which can be accomplished relatively easily.

According to the twenty-fourth aspect of the present invention, for tailing correction, a division included in an arithmetic operation for interpolation can be handled as a division of a power of two which can be done by shifting, so that an increase in a scale of a circuit of an image processor manufactured as an LSI can be prevented.

According to the twenty-fifth of the present invention, a physical area of a modulation range defined by a plurality of items of tailing correction gain modulation data which are discretely placed can be changed in accordance with a size of an effective pixel region of an image sensor, by selection of a bit of an output of each of two counters.

According to the twenty-sixth and twenty-seventh aspects of the present invention, a center of a modulation range for tailing correction gain can be caused to match a center of an effective pixel region of an image sensor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram illustrating an example of a configuration of a principal portion of the color timing arrangement part.

FIG. 5 is a block diagram illustrating a configuration of a portion of the color timing arrangement part.

FIGS. 7A, 7B, and 7C illustrate three types of repeat blocks.

FIG. 8 schematically illustrates offset drift occurring in a black level signal all over an image plane.

FIG. 9 is a block diagram illustrating an example of a configuration of a black level corrector.

FIG. 10 is a block diagram illustrating another example of the configuration of the black level corrector.

FIG. 17 illustrates a method which allows a change in a physical area of the modulation range in the modulation circuit illustrated in FIG. 15.

FIG. 20 is a block diagram illustrating an example of a configuration of a linearization circuit in the SPU circuit in each of the input channels.

FIG. 25 is a block diagram illustrating an example of a configuration of an SPU circuit according to the conventional arts.

FIGS. 26A to 26E, 27A to 27C, and 28 illustrate examples of patterns for reading out image data.

DESCRIPTION OF THE PREFERRED EMBODIMENTS

First Preferred Embodiment

Figure 1:
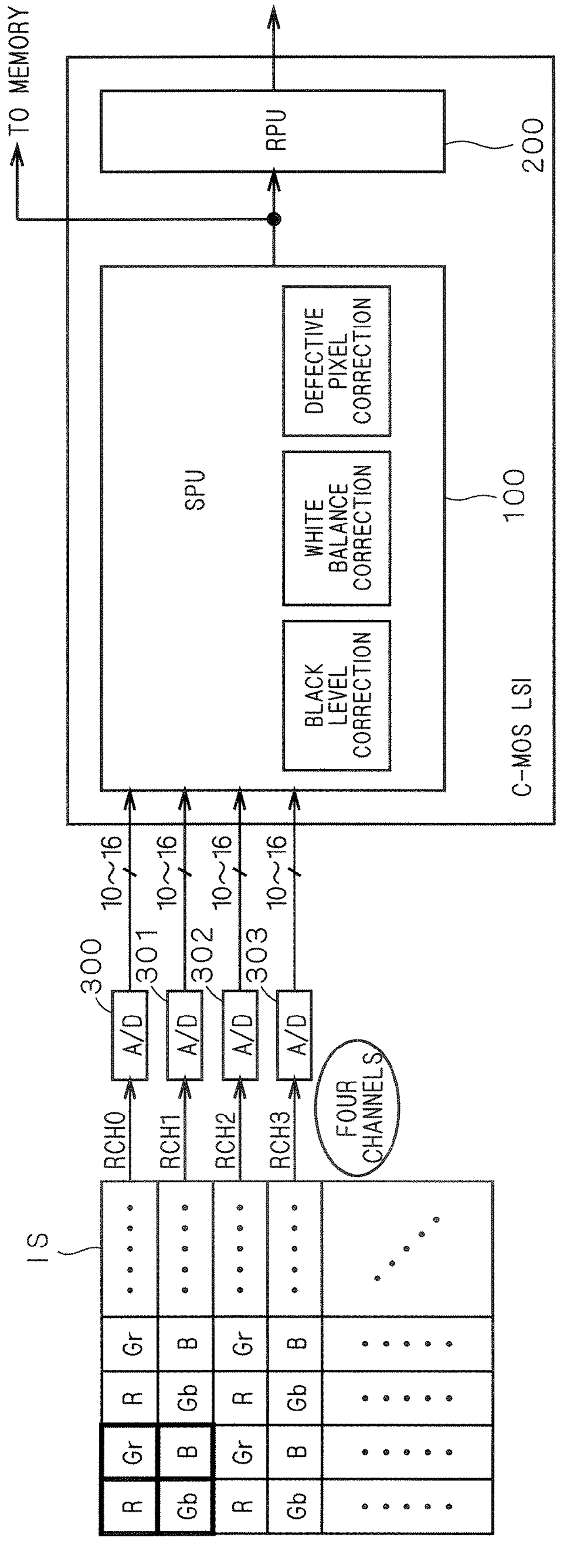
FIG. 1 is a block diagram illustrating connection between readout channels of an image sensor and input channels of an image processor according to a first preferred embodiment.

Configuration for Programming of Color Selection Timing Signal with Plural Input Channels FIG. 1 is a block diagram schematically illustrating a configuration of an image processing LSI used for a digital (still or video) camera according to a first preferred embodiment of the present invention. In an example illustrated in FIG. 1, the number of channels for reading out image data ("image data readout channels") RCH0, RCH1, RCH2, and RCH3 of an image sensor (a solid-state image sensing device such as a CCD sensor or a CMOS sensor, for example) IS is four. An array of color filters (an order in which colors are put) respectively provided on a plurality of pixels placed in an effective pixel region of the image sensor IS are in an RGB Bayer pattern. In the color filter array in an RGB Bayer pattern ("RGB Bayer array"), a green (G) color placed next to a red (R) color is affected by R color, to be expressed as Gr color, and G color placed immediately under R color is affected by B color placed next to G color, to be expressed as Gb color, as indicated by bold lines in FIG. 1.

Figure 23:
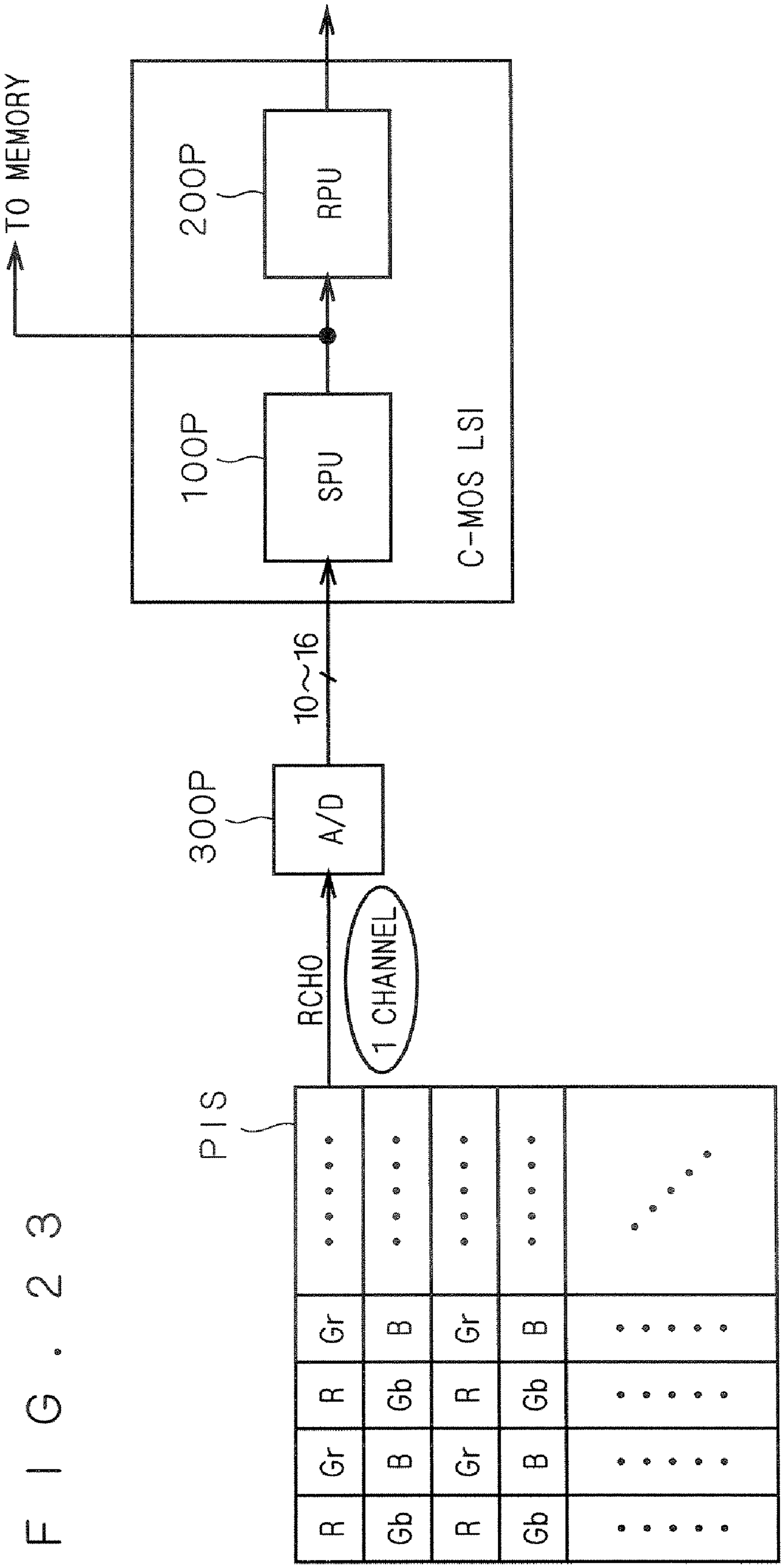
FIG. 23 is a block diagram illustrating connection between readout channels of an image sensor and input channels of an image processor according to the conventional arts.
Figures 24A, 24B, 24C:
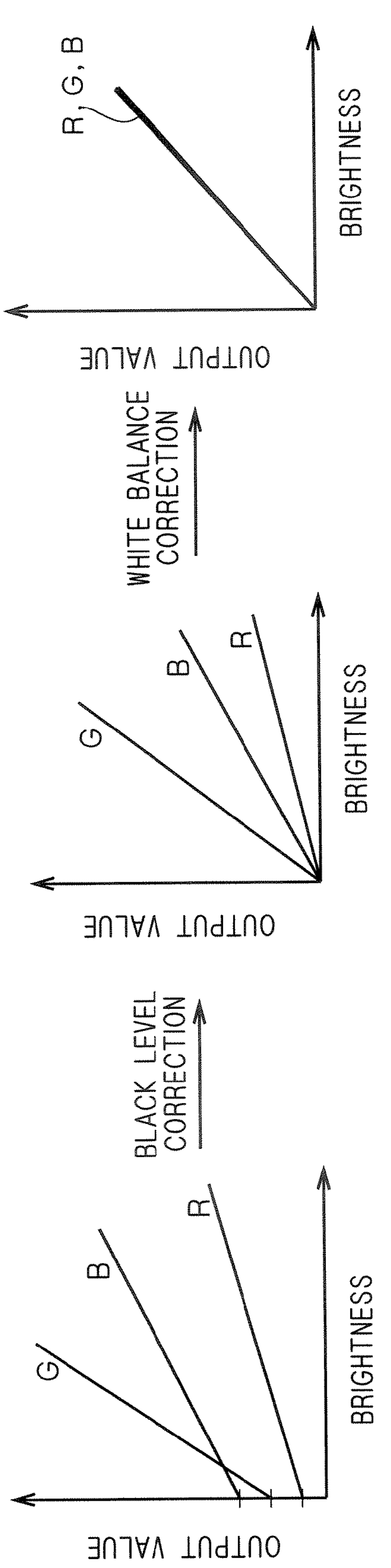
FIGS. 24A, 24B, and 24C illustrate normalization of an RGB Bayer signal.

Items of image data which are read out in parallel via the image data readout channels RCH0, RCH1, RCH2, and RCH3, respectively, in accordance with pixel clocks (not illustrated in FIG. 1) are subjected to A/D conversion in A/D converters 300, 301, 302, and 303 which are respectively connected with the image data readout channels RCH0, RCH1, RCH2, and RCH3, and then, are input to an SPU (image sensor data pre-processing unit (SPU)) 100 provided on a CMOS LSI. Like the SPU 100P illustrated in FIG. 23, the SPU 100 is a first image processor for applying correction (predetermined image processing such as black level correction, white balance correction, and defective pixel correction) which is required due to problems typical of the image sensor IS, to the input image data, to normalize the input RGB Bayer signals (each of which is 10-to-16-bit data forming the image data) (refer to FIGS. 24A, 24B, and 24C in this respect). Also, like the RPU 200P illustrated in FIG. 23, an RPU 200 provided on the CMOS LSI is a second image processor for performing substantial image processing (such as gamma correction and color space conversion) on the RGB Bayer signals which are normalized on a readout-channel-by-readout-channel basis. It is additionally noted that outputs of each of the four channels of the SPU 100 are symbolically expressed by a single line for convenience of illustration in FIG. 1. An internal configuration of the SPU 100 is one centerpiece of the first preferred embodiment, and thus, a configuration and operations of the SPU 100 will be described in detail below.

Figure 2:
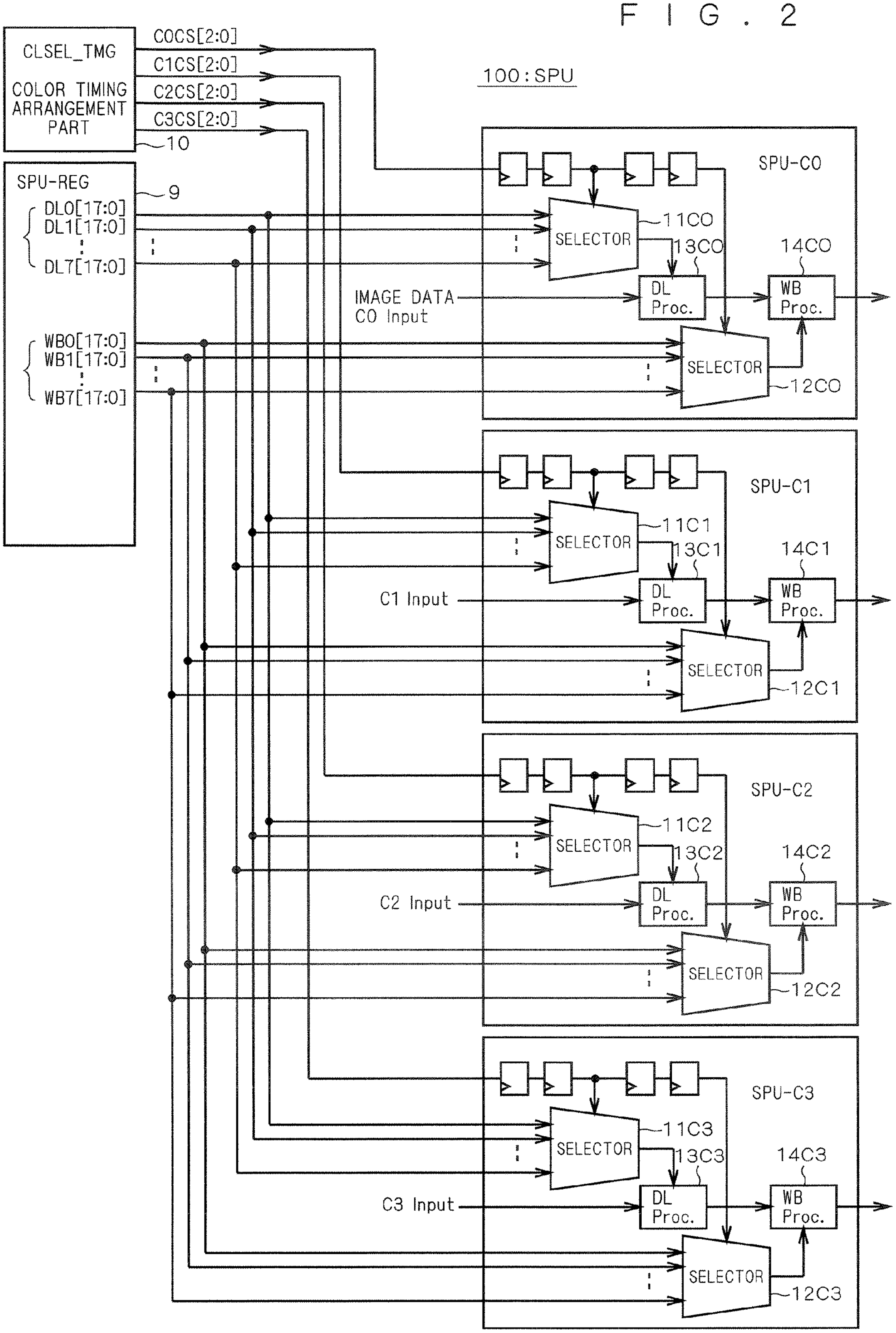
FIG. 2 is a block diagram illustrating an example of a configuration of an SPU circuit of the image processor.
Figure 28:
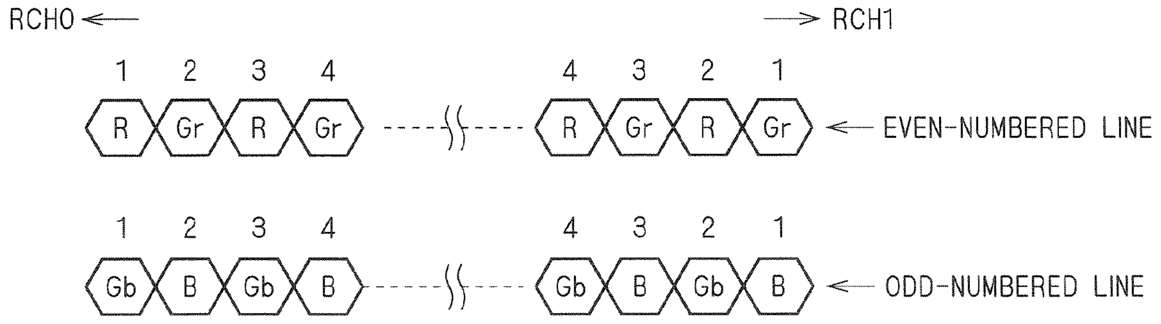

FIG. 2 is a block diagram schematically illustrating a configuration of a principal portion of the SPU 100. The SPU 100 is broadly divided into: (1) first, second, third, and fourth channel correction parts SPU-C0, SPU-C1, SPU-C2, and SPU-C3 which are formed of four unit, respectively, to match the number of the readout channels of the image sensor; (2) a color timing arrangement part 10 for generating and outputting 3-bit color selection timing signals C0CS, C1CS, C2CS, and C3CS for the respective channels; and (3) an SPU register 9 for storing correction data for black level correction (which is an 18-bit signal and will be referred to as "black level correction data") DL0 to DL7 for eight colors and correction data for white balance correction (which is an 18-bit signal and will be referred to as "white balance correction data") WB0 to WB7 for eight colors which are used in common by the first, second, third, and fourth channel correction parts SPU-C0, SPU-C1, SPU-C2, and SPU-C3. It is noted that though a color of each of pixels is identified as any of four colors of R, Gr, Gb, and B colors in an RGB Bayer array basically, the SPU 100 can be adapted for eight colors in the first preferred embodiment. The reason is to allow the SPU 100 to be adapted also for the readout pattern illustrated in FIG. 28.

Out of the above-mentioned elements, the first, second, third, and fourth channel correction parts SPU-C0, SPU-C1, SPU-C2, and SPU-C3 are pipelined image sensor pre-processing units used for a plurality of readout channels. More specifically, when image signals are readout in synchronization with pixel clocks via the plurality of image data readout channels included in the image sensor IS, the channel correction parts SPU-C0, SPU-C1, SPU-C2, and SPU-C3 receive the image signals via respectively corresponding ones of the plurality of input channels at each of the pixel clocks, and perform the above-described predetermined image processing on the received image signals (image data C0 Input, C1 Input, C2 Input, and C3 Input in FIG. 1) in accordance with the above-described color selection timing signals (C0CS, C1CS, C2CS, and C3CS) at each of the pixel clocks in parallel with one another.

The color timing arrangement part 10 constitutes one of structural features of the first preferred embodiment. The color timing arrangement part 10 is a circuit for generating the color selection timing signals C0CS, C1CS, C2CS, and C3CS which independently designate respective colors of pixels at a certain point in time for the input channels respectively based on count values supplied from a horizontal counter and a vertical counter (not illustrated in FIG. 1) for making and controlling a timing for reading out image data from the image sensor IS. The color timing arrangement part 10, further, outputs the generated color selection timing signals C0CS, C1CS, C2CS, and C3CS to the image sensor preprocessing units SPU-C0, SPU-C1, SPU-C2, and SPU-C3, respectively.

Respective input channels of the first, second, third, and fourth channel correction parts SPU-C0, SPU-C1, SPU-C2, and SPU-C3 receive the image data C0 Input, the image data C1 Input, the image data C2 Input, and the image data C3 Input, respectively, which are read out in parallel from the image sensor IS in accordance with pixel clocks. Note that as respective internal configurations of the channel correction parts SPU-C0, SPU-C1, SPU-C2, and SPU-C3 are identical to each other, the respective configurations of the channel correction parts SPU-C0, SPU-C1, SPU-C2, and SPU-C3 will be represented by the following description of the internal configuration of the first channel correction part SPU-C0. As illustrated in FIG. 2, a first selector 11C0 selects an item of black level correction data for a color of a pixel location from which the image data C0 Input is supplied at that time, out of the black level correction data DL0 to DL7 for eight colors, and outputs the selected data item, based on a designated value of the input color selection timing signal C0CS for a first channel. Subsequently, a black level corrector 13C0 performs black level correction on the input image data C0 Input based on the data item which is selected from the black level correction data DL0 to DL7. Further, a second selector 12C0 selects an item of white balance correction data for a color of a pixel location from which the image data C0 Input is supplied at that time, out of the white balance correction data WB0 to WB7 for eight colors, and outputs the selected data item, based on a designated value of the input color selection timing signal C0CS for the first channel. As a result, a white balance corrector 14C0 performs white balance correction on the input image data C0 Input based on the data item which is selected from the white balance correction data WB0 to WB7, and normalizes the input image data C0 Input. Additionally, the other processes such as defective pixel correction which are to be performed subsequently to white balance correction are not illustrated in FIG. 2.

As illustrated in FIG. 2, one of the features of the SPU 100 according to the first preferred embodiment resides in that the SPU register 9 is provided not within each of the channel correction parts SPU-C0, SPU-C1, SPU-C2, and SPU-C3, but outside the channel correction parts SPU-C0, SPU-C1, SPU-C2, and SPU-C3, distinctly from the channel correction parts SPU-C0, SPU-C1, SPU-C2, and SPU-C3. Thus, correction data stored in the SPU register 9 is shared by the channel correction parts SPU-C0, SPU-C1, SPU-C2, and SPU-C3, and such sharing of the correction data allows for considerable reduction in the number of gates forming the register, to thereby achieve lower power consumption of the SPU 100.

Now, a configuration and operations of the color timing arrangement part 10 which is another centerpiece of the first preferred embodiment will be described in detail.

Figure 3:
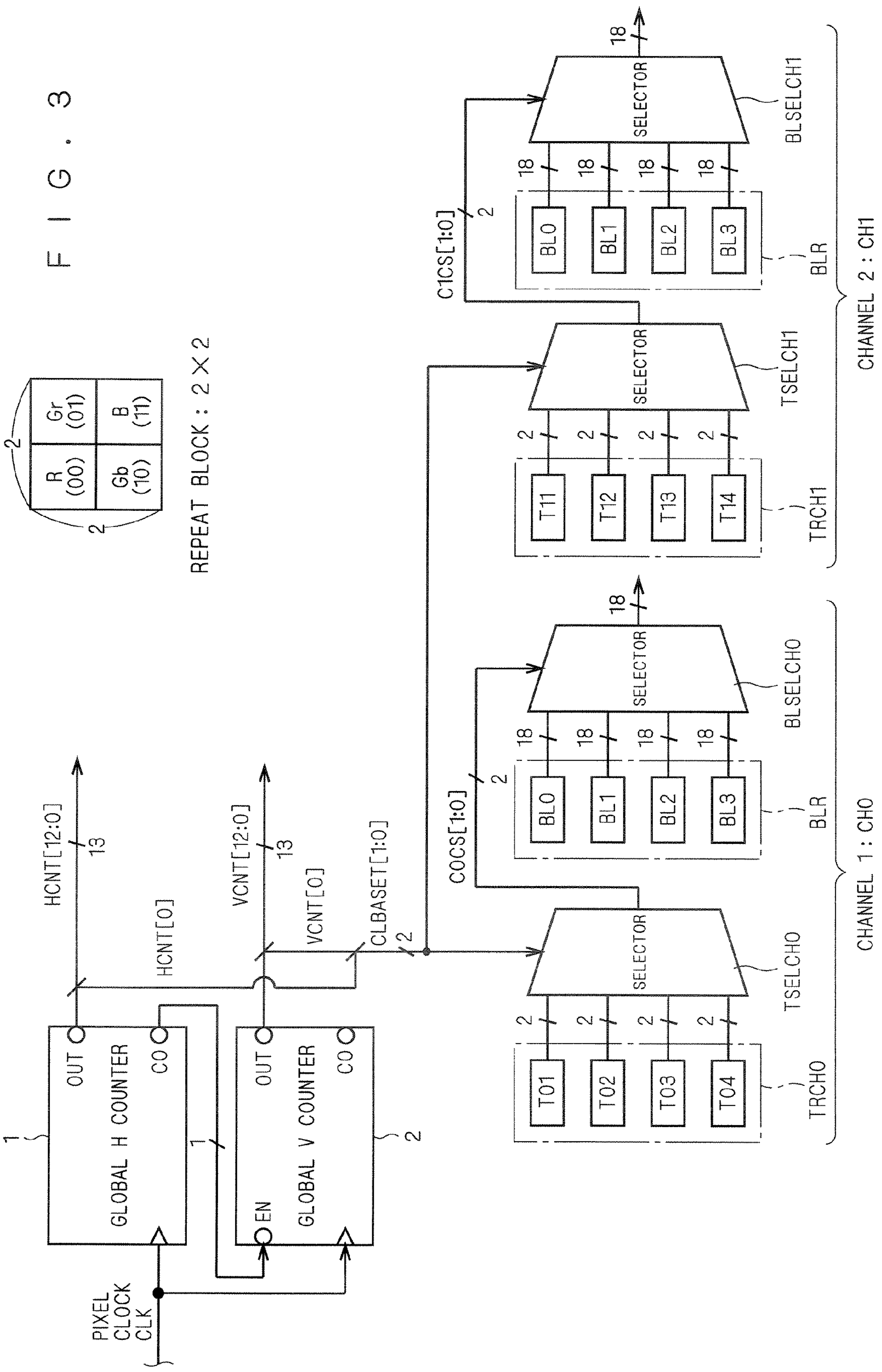
FIG. 3 is a block diagram illustrating principles for operations of a color timing arrangement part.

First, for the purposes of easier understanding of basic configuration and operations of the color timing arrangement part 10, consider a case in which the number of image data readout channels is two and image data is read out in a repeat block having a 2×2-size formed of two pixels arranged in a horizontal direction and two pixels arranged in a vertical direction, or in a cycle corresponding to a 2×2-size repeat block, in an RGB Bayer array. FIG. 3 illustrates a configuration of the color timing arrangement part 10 and a repeat block in the foregoing case.

The global H counter 1 and the global V counter 2 illustrated in FIG. 3 correspond to the global H counter 1 and the global V counter 2 illustrated in FIG. 25, respectively. In the case illustrated in FIG. 3, a repeat block for readout of image has a size of 2×2, so that it is sufficient that a 2-bit signal is supplied as a color base timing signal CLBASET which designates a pixel location within a repeat block at a certain point in time. Accordingly, in the case illustrated in FIG. 3 which is a basic example of the color timing arrangement part 10, the color base timing signal CLBASET is formed by combining the least significant bit HCNT(0) of the count value HCNT of the global H counter 1 and the least significant bit VCNT(0) of the count value of VCNT of the global V counter 2. Also, respective items of the black level correction data for the four colors in an RGB Bayer array are previously stored in registers BL0, BL1, BL2, and BL3, respectively, and a black level correction value register BLR including the four registers BL0, BL1, BL2, and BL3 is used in common by the first and second input channels CH0 and CH1. What is particularly notable with respect to the configuration illustrated in FIG. 3 is additional inclusion of a timing register TRCH0 and a selector TSELCH0 for the timing register TRCH0 which are used exclusively for the input channel CH0 and a timing register TRCH1 and a selector TSELCH1 for the timing register TRCH1 which are used exclusively for the input channel CH1. The timing register TRCH0 which is connected with the first image data readout channel and is used for the first input channel CH0 includes four registers T01, T02, T03, and T04 (respective values thereof are stored by a CPU (not illustrated)) each of which provides a color (any of the four colors in an RGB Bayer array) to each of locations in the repeat block of the color base timing signal CLBASET. More specifically, the timing register TRCH0 is a so-called "index register" in which respective positions of the registers T0, T1, T2, and T3 are selected using the least significant bit of the count value of each of the counters, and then respective color values associated with the positions are stored in the registers placed in the respective selected positions, respectively, by the CPU. Also, the timing register TRCH1 which is connected with the second image data readout channel and is used for the second input channel CH1 has the same configuration as the timing register TRCH0, independently of the timing register TRCH0. Then, the selector TSELCH0 for the first input channel CH0 selects a value in one of the registers T01, T02, T03, and T04 in the timing register TRCH0 which is responsive to a designated value of the color base timing signal CLBASET output along with input of the pixel clock CLK to each of the counters 1 and 2, and outputs the selected value (2-bit signal) to a selector BLSELCH0 provided within the first channel correction part SPU-C0 for the first input channel CH0, as the color selection timing signal C0CS for the first input channel CH0. The color selection timing signal C0CS designates a color of a pixel from which image data is read out via the first image data readout channel at a certain point in time. Likewise, regarding the second input channel CH1, the same operations as described are performed independently of the first input channel CH0. More specifically, the selector TSELCH1 for the second input channel CH1 selects a value in one of registers T11, T12, T13, and T14 in the timing register TRCH1 which is responsive to a designated value of the color base timing signal CLBASET, and outputs the selected value (2-bit signal) to a selector BLSELCH1 provided within the second channel correction part SPU-C1 for the second input channel CH1, as the color selection timing signal C1CS for the second input channel CH1. Also the color selection timing signal C1CS, independently of the color selection timing signal C0CS, designates a color of a pixel from which image data is read out via the second image data readout channel in parallel with the above-described image data at the same certain point in time as described above.

Features of the circuit illustrated in FIG. 3 reside in that an appropriate register is selected out of the plurality of registers included in the timing register based on the color base timing signal CLBASET, and then one of items of the black level correction data which is associated with a color of a pixel at a certain point in time is appropriately selected based on the color selection timing signal generated as a result of the selection of the appropriate register. In other words, the circuit illustrated in FIG. 3 is configured such that a timing for reading out image data is selected first, and subsequently, an item of the black level correction data suitable for the selected timing is selected. As a result of employment of the foregoing configuration, the SPU 100 can cope with various image readout patterns by allowing arbitrary setting of a repeat block. In contrast, in the above-described conventional configuration illustrated in FIG. 25, respective items of the black level correction data for the plurality of channels are read out directly from the register BLR based on the color selection timing signals COLSEL generated by the counters 1 and 2, so that the SPU 100P cannot cope with various image readout patterns.

Based on the understandings of the above description, an example of implementation of the color timing arrangement part 10 illustrated in FIG. 2 will be described.

FIGS. 4 and 5 are block diagrams illustrating examples of implementation of the color timing arrangement part 10. Additional features of a circuit illustrated in FIG. 4 reside that a local H counter 5 and a local V counter 6 are included in addition to the global H counter 1 and the global V counter 2 illustrated in FIG. 5, and the color base timing signal CLBASET is generated by the counters 5 and 6. It is noted that the global H counter 1 and the global V counter 2 illustrated in FIG. 5 correspond to the global H counter 1 and the global V counter 2 illustrated in FIG. 25 or FIG. 3, respectively. Namely, each of the counters 1 and 2 in FIG. 5 functions to determine a location of a pixel from which image data is to be read out, out of pixels in the whole effective pixel region of the image sensor IS.

Out of the above-cited elements, the local H counter 5 is reset by a horizontal reset signal HRESET output from a carry-out terminal CO of the global H counter 1 in FIG. 5 and a reset signal HVRESET for the whole effective pixel region of the image sensor IS, and determines a horizontal cycle of the repeat block of the color base timing signal CLBASET to be a value ranging up to n bit (n≧1). The reset signal HVRESET is an output signal of an AND circuit 3 which receives the horizontal reset signal HRESET and a vertical reset signal VRESET output from a carry-out terminal CO of the global V counter 2, as an input signal thereof, as illustrated in FIG. 5. As described above, the local H counter 5 is able to arbitrarily set a horizontal cycle of a repeat block at a value ranging up to n bit. More specifically, the local H counter 5 includes a register 5R storing data for a horizontal cycle of a repeat block which can be set at a value ranging up to n bit (which data is previously stored in the register 5R by the CPU), as illustrated in FIG. 4. In the present example, data stored in the register 5R is n(=3)-bit long, namely, “8” (=07), and thus, the local H counter 5 outputs a 3-bit count value (HC(0), HC(1), HC(2)) for a horizontal cycle of a repeat block. On the other hand, the local V counter 6 is reset by the output signal HVRESET of the AND circuit 3 and determines a vertical cycle of the repeat block of the color base timing signal CLBASET to be a value ranging up to m bit (m≧1). The local V counter 6 is able to arbitrarily set a vertical cycle of a repeat block at a value ranging up to m bit. More specifically, the local V counter 6 includes a register 6R storing data for a vertical cycle of a repeat block which can be set at a value ranging up to m bit (which data is previously stored in the register 6R by the CPU), as illustrated in FIG. 4. In the present example, data stored in the register 6R is m(=n=3)-bit long, namely, “8” (=07), and thus, the local V counter 6 outputs a 3-bit count value (VC(0), VC(1), VC(2)) for a vertical cycle of a repeat block.

Figure 6A:
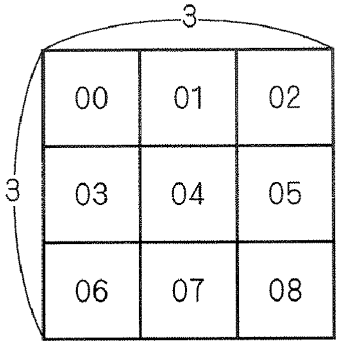
FIGS. 6A and 6B illustrate examples of a repeat block in an arbitrary size which can be set by a local H counter and a local V counter in a circuit illustrated in FIG. 4.
Figure 6B:
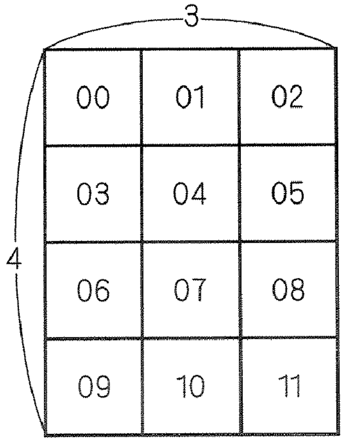

When respective values in the registers 5R and 6R are set at “2” and “2”, respectively, by the CPU, for example, the repeat block of the color base timing signal CLBASET which is generated using the respective count values of the local H counter 5 and the local V counter 6 has a size of 3×3, as illustrated in FIG. 6A. Otherwise, when respective values in the registers 5R and 6R are set at “2” and “3”, respectively, by the CPU, the repeat block has a size of 3×4, as illustrated in FIG. 6B. Thus, a user of the SPU 100 can easily achieve a repeat block of an arbitrary size or in an arbitrary pattern which is ranging up to 8×8 by appropriately setting the values in the registers 5R and 6R, to thereby cope with a variety of image data readout patterns with the use of such a repeat block in an arbitrary pattern.

The local H counter 5 and the local V counter 6 are incorporated in the circuit illustrated in FIG. 4 in order to generate a repeat block with an arbitrary local cycle as described above. More specifically, the AND circuit 3 receives the horizontal reset signal HRESET and the vertical reset signal VRESET output from the carry-out terminal CO of the global V counter 2, as an input signal thereof. Then, the local H counter 5 is reset in synchronization with reset of the global H counter 1, in other words, the local H counter 5 is reset by the horizontal reset signal HRESET and the output signal HVRESET of the AND circuit 3. Also, the local H counter 5 determines a horizontal cycle of the repeat block of the color base timing signal to be a value ranging up to n bit (n≧1). Further, the local V counter 6 is reset in synchronization with reset of the global V counter 2, in other words, the local V counter 6 is reset by the output signal HVRESET of the AND circuit 3. Also, the local V counter 6 determines a vertical cycle of the repeat block of the color base timing signal to be a value ranging up to m bit (m≧1).

In view of the foregoing description, in a repeat block having a size of 8×8 which is the largest size that can be implemented by using the respective count values of the local H counter 5 and the local V counter 6 (in a case where low-order three bits of each of respective count values of the local counters 5 and 6 are used), sixty-four locations, to each of which any of colors is allocated, are provided. Such a large area as to include sixty-four locations is unnecessary, considering actually-used readout patterns. In actual use, in a readout pattern which repeats to get longer in a horizontal direction, a vertical length or a vertical cycle is relatively short. Likewise, in a readout pattern which repeats to get longer in a vertical direction, a horizontal length or a horizontal cycle is relatively short. After consideration of such structural characteristics of readout patterns, the inventor of the present invention conceived that to include sixteen locations in the repeat block of the color base timing signal CLBASET would be sufficient. In a case where a repeat block includes sixteen locations, the size of repeat blocks can be set at any of only three sizes of 4×4, 8×2, and 2×8. Thus, in the circuit illustrated in FIG. 4, a first selector 7 which receives each of the count values HC(1) and VC(2) as an input signal thereof and uses a signal VLEN set by the CPU as a selection signal thereof, and a second selector 8 which receives each of the count values HC(2) and VC(1) as an input signal thereof and uses a signal HLEN set by the CPU, as a selection signal thereof, are provided on an output side of the local H counter 5 and the local V counter 6. Then, by combining four signals of a count signal CLBASET(0)=HC(0), an output signal CLBASET(1) of the first selector 7, an output signal CLBASET(3) of the second selector 8, and a count signal CLBASET(2) VC(0), the color base timing signal CLBASET which is 4-bit long is generated. Accordingly, the color base timing signal CLBASET is a timing signal which indicates a given location at a certain point in time in a repeat block including sixteen locations.

With an image data readout pattern for the image sensor IS, which pattern is actually used by a user, in mind, possible kinds of combinations of the selection signals VLEN and HLEN which are set by the CPU (not illustrated) in the circuit illustrated in FIG. 4 are as shown in FIGS. 7A, 7B, and 7C. More specifically, referring to FIG. 7A, a 4×4-size repeat block can be achieved by using a combination of VLEN=0 and HLEN=0, that is, low-order two bits of a count value of each of the local H counter 5 and the local V counter 6. Otherwise, referring to FIG. 7B, an 8×2-size repeat block in which eight pixels are arranged in a horizontal direction and two pixels, or two lines, are arranged in a vertical direction, can be achieved by setting VLEN and HLEN at 0 and 1, respectively. Further, referring to FIG. 7C, a 2×8-size repeat block in which two pixels are arranged in a horizontal direction and eight pixels are arranged in a vertical direction can be achieved by setting VLEN and HLEN at 1 and 0, respectively. By selectively allocating low-order two bits of a count value of each of the local H counter 5 and the local V counter 6 in the foregoing manner, it is possible to appropriately change the repeat block of the color base timing signal CLBASET. In a case where an extremely complicated readout pattern is required, a bit length of each of the horizontal and vertical counters according to the present invention may be increased so that an 8×8- or 16×16-size repeat block can be achieved, of course.

By appropriately selecting and setting one of the foregoing three types of repeat blocks of the color base timing signals CLBASET, it is possible to allow the SPU 100 including the circuit illustrated in FIG. 4 to cope with a variety of image data readout patterns of the image sensor IS.

As illustrated in FIG. 4, timing registers TR0, TR1, TR2, and TR3, and selectors TRS0, TRS1, TRS2, and TRS3 for the timing registers are provided for the input channels CH0, CH1, CH2, and CH3, respectively. Each of the timing registers TR0, TR1, TR2, and TR3 is an index register which has been described above with reference to FIG. 3. As the number of locations in a repeat block of the color base timing signal CLBASET is sixteen, each of the timing registers TR0, TR1, TR2, and TR3 includes sixteen registers because. Accordingly, a user selects each of respective positions of the sixteen registers with the use of a signal obtained by combining low-order two bits of a count value of each of the counters 5 and 6, and then, stores data for a color of each of the locations in the repeat block which are respectively associated with the registers placed in the selected positions by using the CPU. As a result, each of the timing registers TR0, TR1, TR2, and TR3 is provided with respective outputs (each of which is an 3-bit signal because the number of kinds of colors is eight) of the sixteen registers. Each of the respective outputs of the sixteen registers determines the kind of a color at one concerned out of the locations in the repeat block at a certain point in time. Then, each of the selectors TRSX (X:0, 1, 2, or 3) selects an output of a register which determines the kind of a color at the corresponding location in the repeat block at a time of readout, out of the sixteen outputs of the corresponding timing register TRX (X:0, 1, 2, and 3) in accordance with the level of the color base timing signal CLBASET as received, and outputs the selected output as the color selection timing signal CXCS (X:0, 1, 2, or 3) for each of the input channels CHX (X:0, 1, 2, or 3). The color selection timing signal CXCS output from each of the selectors TRSX corresponds to any of the color selection timing signals C0CS, C1CS, C2CS, and C3CS (each of which is a 3-bit signal) in FIG. 2.

As is made clear from the above description, a portion of the circuit which includes elements denoted by reference numerals "1", "2", "3", "4", "5", "6", "7", and "8" in FIGS. 4 and 5 form "a color base timing signal generator" for generating the color base timing signal CLBASET whose repeat block is defined by combining a low-order bit signal (one bit or more) including at least the least significant bit out of an output signal of the horizontal counter and a low-order bit signal (one bit or more) including at least the least significant bit out of an output signal of the vertical counter. It is noted that as long as any of the types of the repeat blocks which are illustrated in FIGS. 7A, 7B, and 7C is employed, the local H counter 5 and the local V counter 6 are not necessarily applied. In a case where the local H counter 5 and the local V counter 6 are not applied, generation of the color base timing signal CLBASET for implementing any one of the three patterns of the repeat block illustrated in FIGS. 7A, 7B, and 7C is achieved by using the respective count values of the global H counter 1 and the global V counter 6 illustrated in FIG. 5. In this sense, the above terms "horizontal counter" covers both a case where only the global H counter 1 is used and a case where the global H counter 1 and the local H counter 5 are used. Likewise, the above terms "vertical counter" covers both a case where only the global V counter 1 is used and a case where the local V counter 3 and the local V counter 6 are used. Also, the selectors 7 and 8 in FIG. 4 are collectively referred to as a "selection part".

The SPU 100 in FIG. 2 is able to advantageously function to handle eight colors and allow independent setting of the kinds of colors in a repeat block for each of the channels because a timing signal which determines a color is provided individually for each of the input channels. Accordingly, any of eight items of the black level correction data (or eight items of the white balance correction data) which are stored in the SPU register 9 provided outside the channel correction parts SPU-CX (X:0, 1, 2, and 3) is selected for each of locations in a repeat block. It is again set forth that the SPU 100 is able to perform a process for allocating colors conforming to a readout pattern to each of the four channel correction parts for the input channels, individually, at an arbitrary time.

<Two-Dimensional Modulation of Black Level>

As described above, in black level correction which is a first stage of normalization of an RGB Bayer signal, it has become more difficult to regard a value of black level correction data for each of the colors as being constant everywhere in an image plane of the image sensor IS either because of miniaturization of the image sensor IS along with an increase in the number of pixels in the image sensor IS, or under the influence of a portion of a semiconductor wafer which is cut out to be used as a chip for the image sensor IS. More specifically, subtle distortion occurs in black level correction data for each of the colors all over the image plane of the image sensor IS (black level correction data is not uniform). In other words, offset drift occurs in black level correction data for each of the colors all over the image plane of the image sensor IS. For example, as exemplified in FIG. 8, offset values Δ Mx and Δ My are respectively caused in items of black level correction data DLix and Dliy in an x direction and a y direction of each color i of the four colors (R, Gr, Gb, and B) in an effective pixel region EPR, and each of the offset values Δ Mx and Δ My subtly changes across the effective pixel region EPR. One possible solution to remove such offset drift in black level correction data for each of the colors is to regard the offset values Δ Mx and Δ My at a location of one of all pixels as modulation data of the black level correction data DLix and DLiy and respectively subtract the offset values Δ Mx and Δ My from the items of black level correction data DLix and DLiy which are constant, for each of all pixels. However, such pixel-by-pixel and color-by-color correction is impractical, considering the number of pixels included in the image sensor IS. Therefore, practical measures to effectively reduce offset drift in the black level correction data which occurs all over the image plane of the image sensor as exemplified in FIG. 8 has been demanded.

To satisfy the foregoing demand, according to the first preferred embodiment, each of the black level correctors 13CX (X: 0, 1, 2, and 3) provided in the channel correction parts (which will be also referred to as "SPU circuits") SPU-CX respectively for the readout channels illustrated in FIG. 2 holds a plurality of items of black level modulation data which are discretely placed within position coordinates defined by the global H counter 1 and the global V counter 2, and modulation data for black level correction data at a location of a pixel corresponding to an input image signal is obtained by carrying out interpolation using the plurality of items of black level modulation data. In the foregoing approximation method, it is sufficient that each of the SPU circuits SPU-CX holds the plurality of items of black level modulation data.

There are two possible types of circuit configurations for each of the black level correctors 13CX (X: 0, 1, 2, or 3) in the input channels CHX. The first type is illustrated in FIG. 9. In the configuration illustrated in FIG. 9, upon receipt of input image data CX Input (X: 0, 1, 2, or 3), the black level correction data DLi (i: 0, 1, 2, or 3) which is constant and relates to a color of a given pixel which outputs the corresponding input image data CX Input (X: 0, 1, 2, or 3) is selected by the selector 11CX (X: 0, 1, 2, or 3) in accordance with a designated value of the color selection timing signal CXCS (X: 0, 1, 2, or 3), and the selected black level correction data DLi is subtracted from the input image data CX Input (X: 0, 1, 2, or 3) by a subtracter 28. Thereafter, modulation data MDLi (i: 0, 1, 2, or 3) for the given pixel which is obtained by carrying out interpolation in a modulation circuit 2DCOR is further subtracted from the result of the first subtraction output from the subtracter 28, by a subtracter 29. In the first type of circuit configuration, even if the subtracters 28 and 29 are placed in a reverse order, the same result of modulating the black level correction data (black level signal) is produced. It is noted that the SPU register 9 includes four registers 91, 92, 93, and 94 for storing the respective items of black level correction data DL0, DL1, DL2, and DL3 for the four colors (R, Gr, Gb, and B), respectively, for convenience's sake in the configuration illustrated in FIG. 9.

Alternatively, the second type is illustrated in FIG. 10. In the circuit configuration illustrated in FIG. 10, the black level corrector 13CX (X: 0, 1, 2, or 3) is formed in each of the input channels CHX. In the second type of the circuit configuration, modulation data MDLiP (i: 0, 1, 2, or 3) for a given pixel which is obtained by carrying out interpolation in the modulation circuit 2DCOR and one of the items of black level correction data (constant value) DLi for a color of the given pixel which is selected by the selector 11CX (X: 0, 1, 2, or 3) are multiplied by a multiplier 30, to obtain the modulation data MDLi (I: 0, 1, 2, or 3), and thereafter the result of the multiplication is subtracted from the input image data CX Input by a subtracter 31.

Whichever type may be employed, it can be understood that the black level corrector 13CX (X: 0, 1, 2, or 3) for each of the input channels CHX functions to modulate the constant black level correction data for a color associated with an input image signal in accordance with a location of a pixel corresponding to the input image signal, and to subtract appropriate modulation data from the input image signal. In later description, it is assumed that the configuration illustrated n FIG. 9 is employed for convenience's sake.

Figure 11:
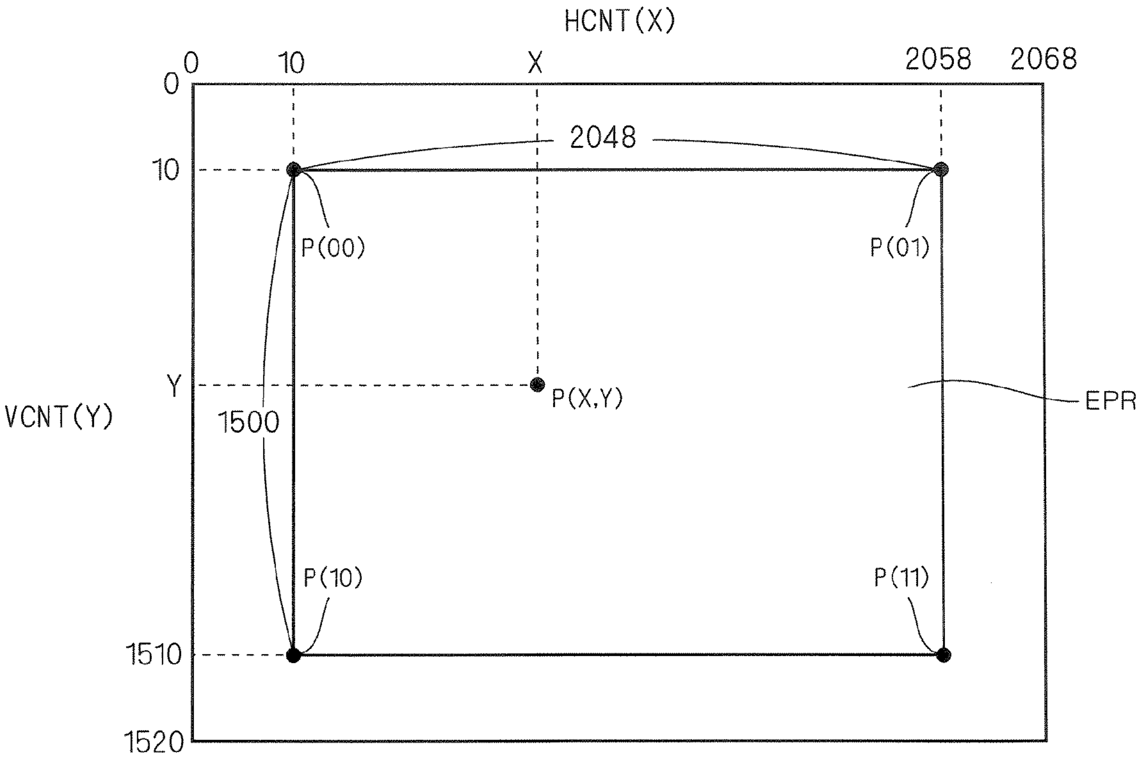
FIG. 11 illustrates principles for a method of obtaining modulation data in a modulation circuit.

FIG. 11 schematically illustrates a method of calculating modulation data in the modulation circuit 2DCOR. In FIG. 11, a lateral axis represents the count value HCNT(X) of the global H counter (which will be hereinafter simply referred to as an "H (or horizontal) counter") 1, and a longitudinal axis represents the count value VCNT(Y) of the global V counter (which will be hereinafter simply referred to as a "V (or vertical) counter) 2. Also, FIG. 11 illustrates a best condition in which items of black level modulation data P(00), P(01), P(10), and P(11) are placed at pixel locations in four corners of the effective pixel region EPR of the image sensor IS, respectively, for convenience's sake. The four items of black level modulation data P(00), P(01), P(10), and P(11) are previously stored in the register (not illustrated) included in the modulation circuit 2DCOR by the CPU (not illustrated). To obtain each of the four items of black level modulation data P(00), P(01), P(10), and P(11), a black level signal of each of pixel locations on an image plane of the image sensor IS which has a two-dimensionally non-uniform offset value is previously measured by a manufacturer of a digital camera, and data corresponding to an offset value (refer to the offset values Δ Mx and Δ My in FIG. 8) for each of the pixel locations (10, 10), (2058, 10), (10, 1510), and (2058, 1510) is calculated based on the measurement results. The calculation results are set in the respective registers as the items of black level modulation data P(00), P(01), P(10), and P(11).

Referring to FIG. 11, the modulation circuit 2DCOR includes an interpolation operator for calculating modulation data P(X, Y) for black level at a given pixel location (X, Y) by carrying out interpolation, or linear interpolation, using the preset items of black level modulation data P(00), P(01), P(10), and P(11) for the predetermined four locations. For example, in a case where offset drift occurs in a black level signal to permit the items of black level modulation data P(00), P(01), P(10), and P(11) to become "100", "20", "20", and "10", respectively, a value of the modulation data P(X, Y) at a center of the effective pixel region EPR is equal to 37.5 when the value is approximated using linear interpolation. Thus, in the condition illustrated in FIG. 11, the modulation circuit 2DCOR according to the first preferred embodiment determines a value of the modulation data P(X, Y) at each of pixel locations by carrying out interpolation using the four preset items of black level modulation data P(00), P(01), P(10), and P(11). In the condition illustrated in FIG. 11, it is sufficient that the modulation circuit 2DCOR holds only the four items of black level modulation data P(00), P(01), P(10), and P(11) as data, to thereby practically and simply obtain the modulation data P(X, Y) at each of the pixel locations.

Figure 12:
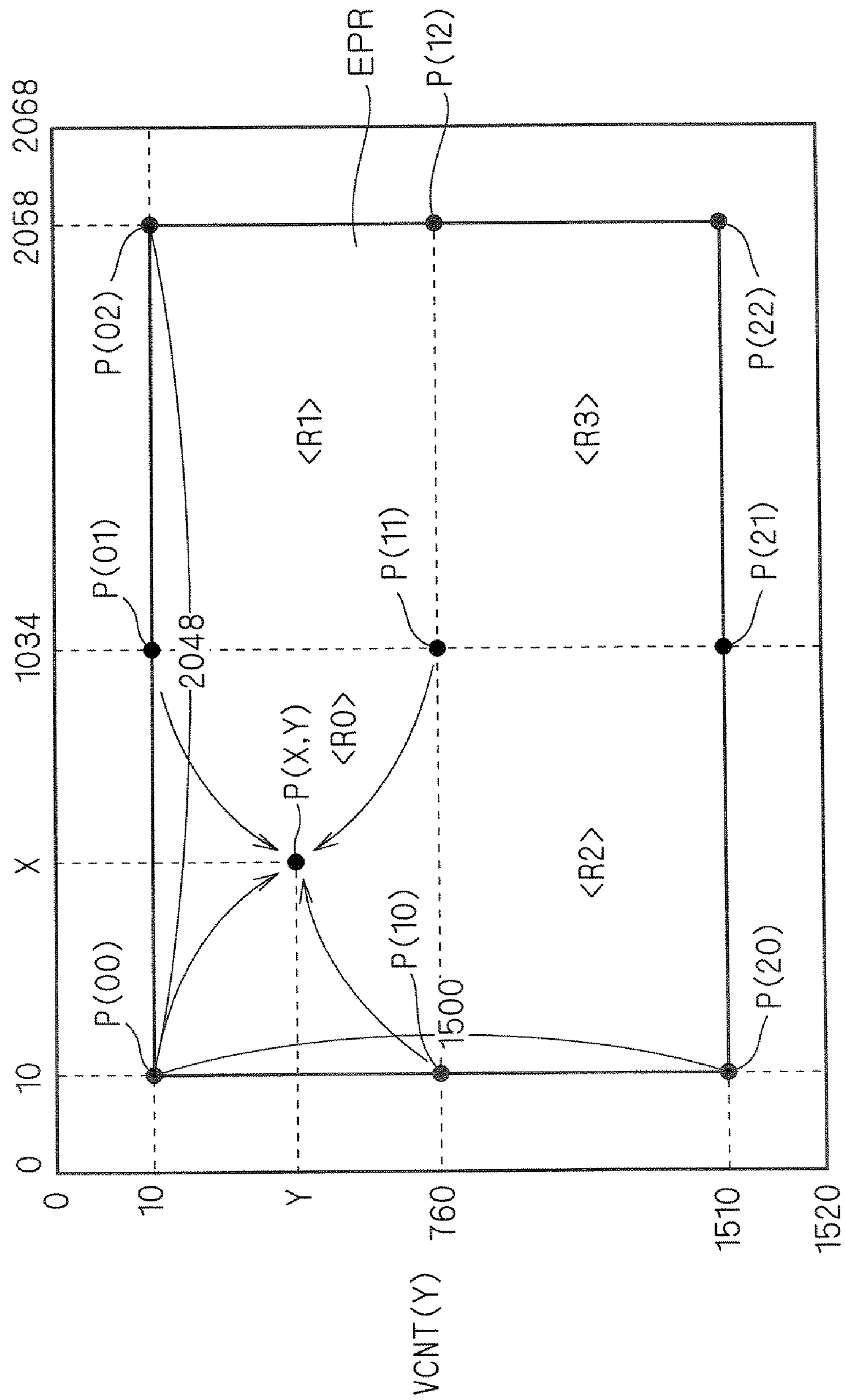
FIG. 12 illustrates principles for another method of obtaining the modulation data in the modulation circuit.

FIG. 12 illustrates another example of a method of obtaining the modulation data P(X, Y) at each of the pixel locations by interpolation. In FIG. 12, nine items of black level modulation data are previously set by a manufacturer of a digital camera. Specifically, four items of black level modulation data P(00), P(02), P(20), and P(22) are placed in four corners of the effective pixel region EPR, respectively, in the same manner as in FIG. 11. Also, additional four items of black level modulation data P(011), P(10), P(21), and P(12) are placed at respective centers of four sides of the effective pixel region EPR, and one further additional item of black level modulation data P(11) is placed at a center of the effective pixel region EPR. As a result, the effective pixel region EPR is divided into four sections <R0>, <R1>, <R2>, and <R3> by the above-mentioned nine items of black level modulation data. In the example in FIG. 12, the modulation circuit 2DCOR obtains the modulation data P(X, Y) at one pixel location (X, Y) in any of the sections <Ri> (i: 0, 1, 2, or 3) by interpolation using the four items of black level modulation data which are respectively placed in four corners of the corresponding section <Ri>. For example, in order to obtain the modulation data P(X, Y) at a pixel location (X, Y) in the section <R0>, interpolation is carried out using four items of black modulation data P(00), P(01), P(10), and P(11). Also, in order to obtain the modulation data P(X, Y) at a pixel location (X, Y) in the section <R1>, interpolation is carried out using the four items of black modulation data P(01), P(02), P(11), and P(12). In order to obtain the modulation data at a pixel location in the other sections <R2> and <R3>, the same operations as described above are performed. Thus, in the condition illustrated in FIG. 12, the modulation circuit 2DCOR according to the first preferred embodiment determines a value of the modulation data P(X, Y) at each of pixel locations by carrying out interpolation using the nine preset items of black level modulation data P(00), P(01), P(10), P(11), P(02), P(12), P(20), P(21), and P(22). In the condition illustrated in FIG. 12, it is sufficient that the modulation circuit 2DCOR holds only the foregoing nine items of black level modulation data as data, to thereby practically and simply obtain the modulation data P(X, Y) at each of the pixel locations.

Principles for the method of calculating modulation data (offset value) at each of pixel locations in the modulation circuit 2DCOR according to the first preferred embodiment are as described above. However, there are the following problems with the above-described method.

Figure 13:
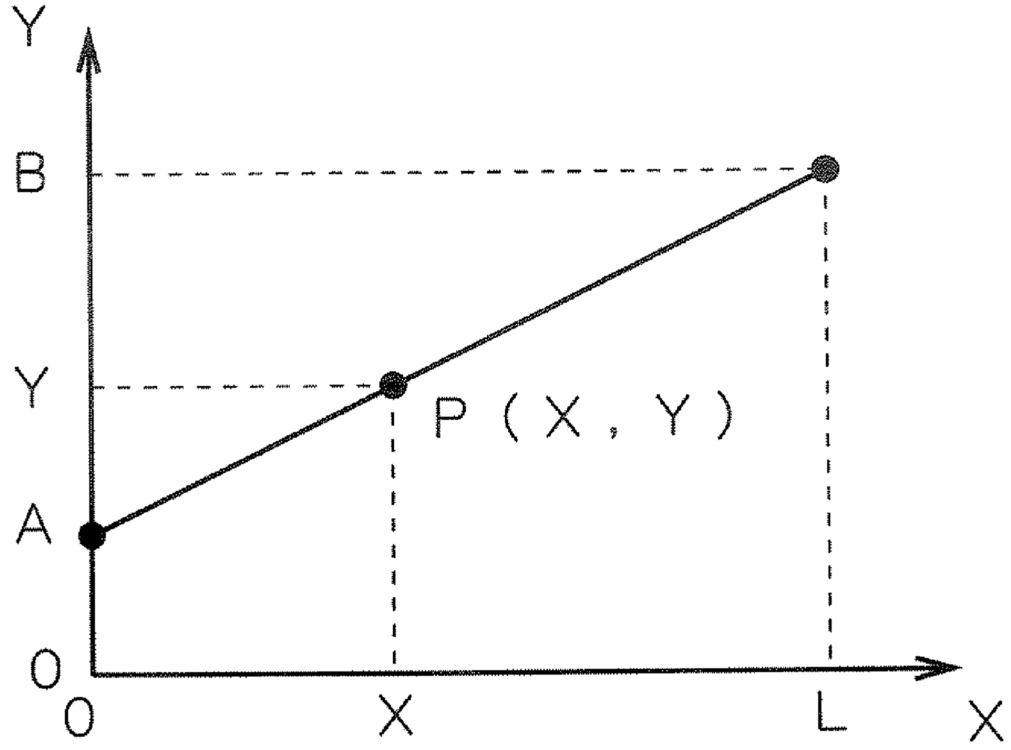
FIG. 13 illustrates an example of a one-dimensional linear interpolation.

Specifically, in carrying out interpolation on modulation data at each of pixel locations using a plurality of items of black level modulation data, division must be done in an arithmetic operation for interpolation. For example, as is found in FIG. 13 which shows one-dimensional interpolation, an arithmetic expression for providing an arbitrary point P(X, Y) placed between two points (0, A) and (L, B) is $Y=A+(B-A)/L\times X$, which includes division of 1/L. Such inclusion of division necessitates an increase in the number of gates, which then increases the circuit scale of the SPU 100 which is designed and manufactured using an LSI. As such, as is generally known, division is a troublesome operation for an LSI circuit.

Nonetheless, it is impossible to remove division from an arithmetic operation for interpolation. Thus, if division included in an arithmetic operation for interpolation can be expressed as “$\frac{1}{2}^{n}$”, an LSI circuit can easily cope with the division by performing shifting using a shift register (for example, “100” in binary notation corresponds to “4” in decimal notation, and “010” in binary notation which is obtained by shifting “100” rightward by one bit corresponds to “2” in decimal notation, so that rightward shifting of data in binary notation by one bit corresponds to division of ½ in decimal notation).

Figure 14:
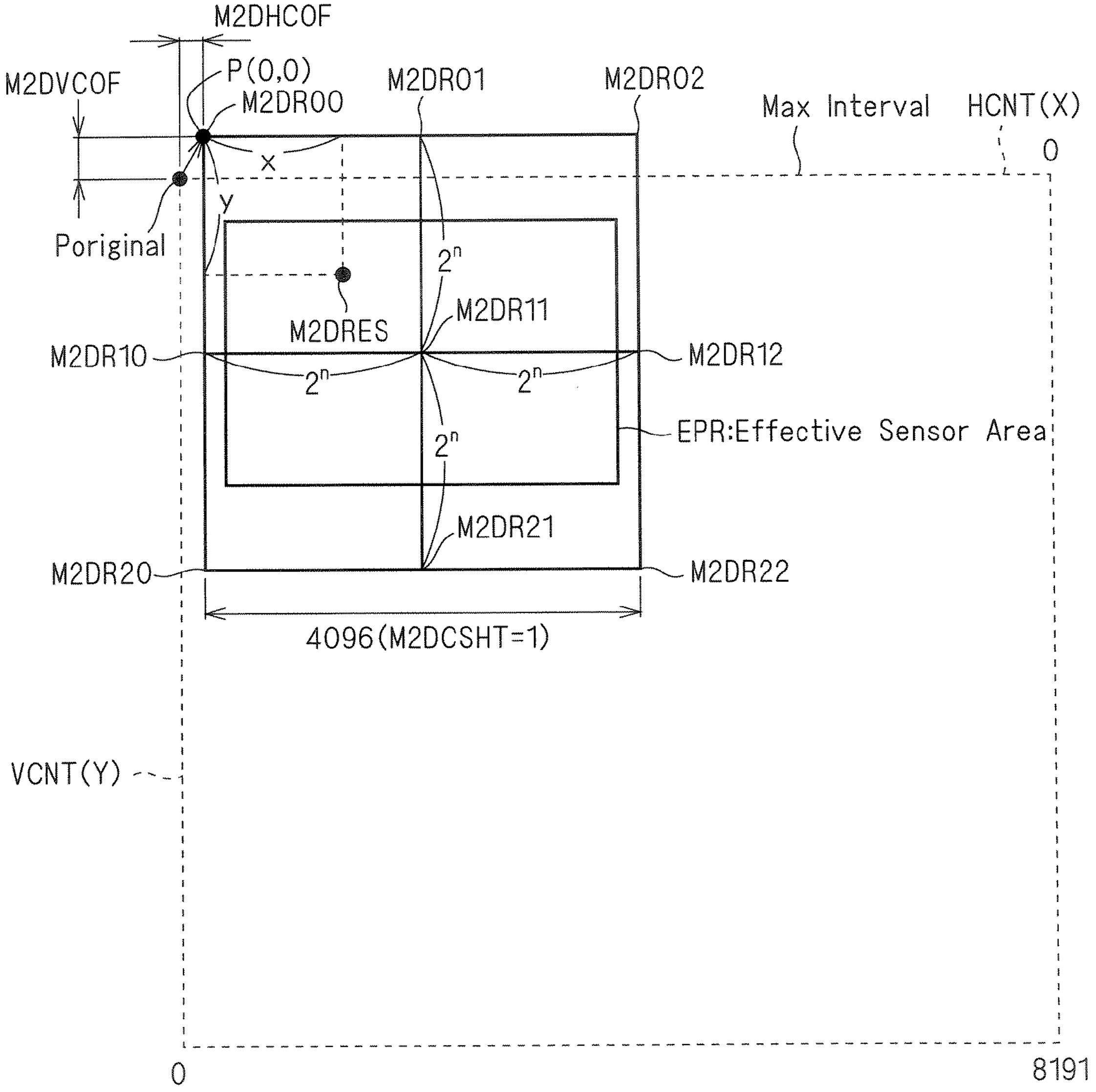
FIG. 14 illustrates a practical method of obtaining the modulation data in the modulation circuit.

In view of the foregoing, in the modulation circuit 2DCOR according to the first preferred embodiment, a modulation range defined by the preset plural items of black level modulation data is set to allow the items of black level modulation data to be arranged such that a distance between two adjacent items of black level modulation data is always equal to $2^n$ (n is a positive integer) except when the two adjacent items are lying on a diagonal line, as illustrated in FIG. 14. In the modulation range defined based on the foregoing arrangement of the items of black level modulation data, an item of black level modulation data M2DR11 is located at a center, and the other items of black level modulation data are located in positions spaced $2^n$ from the center in horizontal and vertical directions so as to be symmetrical with one another, as illustrated in FIG. 14. Also, the modulation range illustrated in FIG. 14 is divided into four zones or sub-regions each of which is defined by four items of black level modulation data. According to one example illustrated in FIG. 14, the modulation range in which nine items of black level modulation data are placed is a 4096×4096-size square, so that the number of pixels included in the effective pixel region EPR of the image sensor IS is about 10M.

It should be kept in mind that coordinates of a center of the modulation range in which nine items of black level modulation data are placed as illustrated in FIG. 14 do not match coordinates of a center of the effective pixel region EPR of the image sensor IS in general. Such difference in coordinates of a center reduces accuracy in correction. For this reason, a physical original point Poriginal of axes of position coordinates defined by the count value HCNT(X) of the H counter 1 and the count value VCNT(X) of the V counter 2 is shifted so that the coordinates of the center of the modulation range can match the coordinates of the center of the effective pixel region EPR of the image sensor IS being employed. A virtual original point of axes of position coordinates which is obtained by the foregoing shifting of the physical original point is expressed as “P(0, 0)” in FIG. 14. In order to achieve the shifting of the physical original point of axes of position coordinates, which will be later described in detail, first, the coordinates of the center of the modulation range in FIG. 14 which is defined by the nine items of black level modulation data (in other words, which is defined by high-order bits of the count value HCNT(X) of the H counter 1 and high-order bits of the count value VCNT(X) of the V counter 2) and the coordinates of the center of an effective pixel region of an image sensor being employed are recognized. Subsequently, an offset value which can take on a positive or negative value which allows the coordinates of the foregoing two centers to match with each other is calculated. Then, the offset value is added to an output value of each of the H counter 1 and the V counter 2. As a result, modulation data M2DRES which corresponds to an offset value of black level at a pixel location which is at a distance of x in a horizontal direction and at a distance of y in a vertical direction from the virtual original point P(0, 0) obtained by the shifting (addition of an offset value) can be obtained by carrying out interpolation using items of black level modulation data M2DR00, M2DR01, M2DR10, and M2DR11 which are respectively placed in four corners of an upper left one out of the four zones of the modulation range. Also modulation data at a pixel location in the other zones can be obtained by carrying out interpolation using items of black level modulation data in four corners of a corresponding zone in the same manner as described above.

Figure 15:
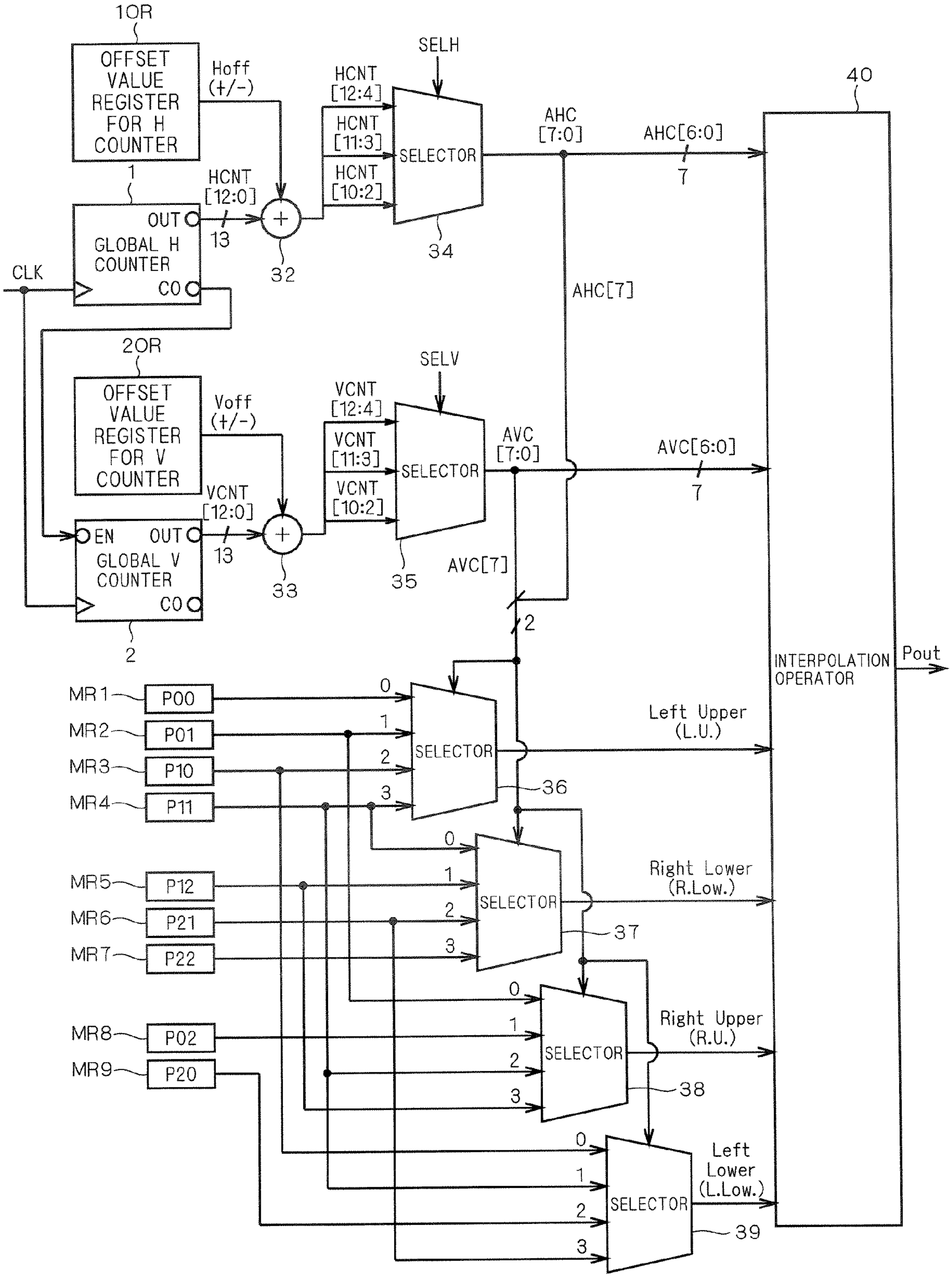
FIG. 15 is a block diagram illustrates an example of a configuration of the modulation circuit.

FIG. 15 is a block diagram illustrating a specific example of a configuration of the modulation circuit 2DCOR which carries out interpolation of modulation data illustrated in FIG. 14. In FIG. 15, a register 1OR stores an amount of horizontal shift of the physical original point Poriginal of the axes of the position coordinates defined by the count value HCNT(X) of the H counter 1 and the count value VCNT(X) of the V counter 2 for allowing the coordinates of the center of the modulation range and the coordinates of the center of the effective pixel region EPR of the image sensor IS being employed to match with each other. The foregoing amount of horizontal shift is represented as an offset value Hoff(+/−) (which corresponds to an offset value M2DHCOF in FIG. 14) in FIG. 15. An adder 32 adds the offset value Hoff(+/−) to the count value HCNT (a 13-bit signal) of the H counter 1. Similarly, a register 2OR stores an amount of vertical shift of the physical original point Poriginal of the axes of the position coordinates for allowing the coordinates of the center of the modulation range and the coordinates of the center of the effective pixel region EPR of the image sensor IS being employed to match with each other. The foregoing amount of vertical shift is represented as an offset value Voff(+/−) (which corresponds to an offset value M2DVCOF in FIG. 14) in FIG. 15. An adder 33 adds the offset value Voff(+/−) to the count value VCNT (a 13-bit signal) of the V counter 2.

In the example of a circuit illustrated in FIG. 15, the 13-bit signal as the count value HCNT to which the offset value Hoff(+/−) is added is separated into three counter-output signals HCNT[12:4], HCNT[11:3], and HCNT[10:2]. In the following discussion, it is assumed that each of the counter-output signals HCNT[12:4], HCNT[11:3], and HCNT[10:2] is an 8-bit signal for convenience's sake. Then, a selector 34 selects one of the three counter-output signals HCNT[12:4], HCNT[11:3], and HCNT[10:2] in accordance with a designated value of a selection signal SELH produced by the CPU (not illustrated). As a result of this selection, a physical length in a horizontal direction of a modulation range is defined as later described in detail. Likewise, the 13-bit signal as the count value VCNT to which the offset value Voff(+/−) is added is separated into three counter-output signals VCNT [12:4], VCNT[11:3], and VCNT[10:2] each of which is an 8-bit signal. Then, a selector 35 selects one of the three counter-output signals VCNT[12:4], VCNT[11:3], and VCNT[10:2] in accordance with a designated value of a selection signal SELV produced by the CPU (not illustrated). As a result of this selection, a physical length in a vertical direction of a modulation range is defined as later described in detail.

Figure 16:
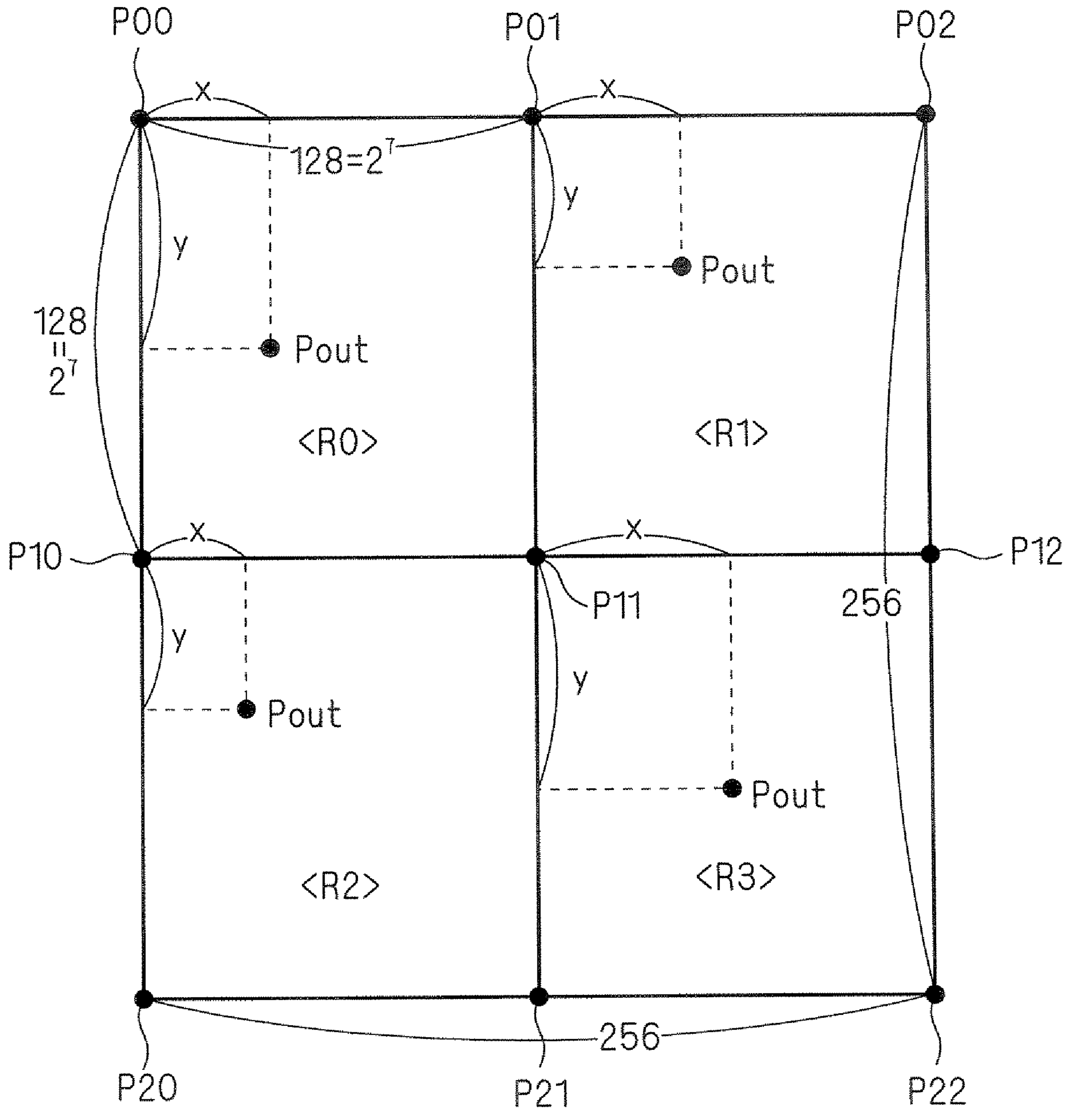
FIG. 16 illustrates a practical method of obtaining the modulation data in a case where a modulation range is set to have a size of 256×256 in the modulation circuit illustrated in FIG. 15.

In the present discussion, it is assumed that the counter-output signal HCNT[12:4] and the counter-output signal VCNT[12:4] are selected as an output signal AHC (an 8-bit signal) of the selector 34 and an output signal AVC (an 8-bit signal) of the selector 35, respectively, for convenience's sake. As a result of this selection, a modulation range defined by the counter-output signals HCNT[12:4] and VCNT[12:4] is a 256×256-size square as illustrated in FIG. 16. Then, in this case, the 256×256-size modulation range is defined by nine items of black level modulation data including an item of black level modulation data P11 placed at a center of the modulation range, four items of black level modulation data P00, P02, P20, and P22 which are placed in four corners of the modulation range, respectively, and further four items of black level modulation data P01, P10, P12, and P21 which are placed at respective centers of four sides of the modulation range, respectively. As a result, the modulation range is divided into four zones or sub-regions <R0>, <R1>, <R2>, and <R3> each of which is a $128(2^7)\times128(2^7)$-size square.

The nine items of black level modulation data P11, P00, P02, P20, P22, P01, P10, P12, and P21 are previously stored in registers MR1 to MR9, respectively, by the CPU (not illustrated) in the circuit illustrated in FIG. 15. Then, the most significant bit AHC(7) of the output signal AHC of the selector 35 (which corresponds to the counter-output signal HCNT [12:4]) and the most significant bit AVC(7) of the output signal AVC of the selector 35 (which corresponds to the counter-output signal VCNT[12:4]) are combined into a 2-bit signal, which thereafter serves as a selection signal of each of selectors 36, 37, 38, and 39. Accordingly, the composite signal obtained by combining the most significant bit AHC(7) of the output signal AHC and the most significant bit AVC(7) of the output signal AVC indicates which of the four sub-regions <R0>, <R1>, <R2>, and <R3> in FIG. 16, each of observed pixels placed at a location defined by the H counter 1 and the V counter 2 belongs to. For example, if a value "0" of each of the selectors 36, 37, 38, and 39 is selected, an observed pixel is determined to be placed in the sub-region <R0> in FIG. 16. Alternatively, if a value "1" of each of the selectors 36, 37, 38, and 39 is selected, an observed pixel is determined to be placed in the sub-region <R1> in FIG. 16. Further alternatively, if a value "2" of each of the selectors 36, 37, 38, and 39 is selected, an observed pixel is determined to be placed in the sub-region <R2> in FIG. 16. Still further alternatively, if a value "3" of each of the selectors 36, 37, 38, and 39 is selected, an observed pixel is determined to be placed in the sub-region <R3> in FIG. 16.

Then, the remaining low-order bits AHC[6:0] of the output signal AHC determine a position of the corresponding observed pixel at a distance of x in a horizontal direction from a local original point of the sub-region <Rj> (j: 0, 1, 2, or 3) to which the corresponding observed pixel belongs, in other words, from the upper left corner of the sub-region <Rj>. Likewise, the remaining low-order bits AVC[6:0] of the output signal AVC determine a position of the corresponding observed pixel at a distance of y in a vertical direction from a local original point of the sub-region <Rj> (j: 0, 1, 2, or 3) to which the corresponding observed pixel belongs, in other words, from the upper left corner of the sub-region <Rj>.

In the modulation range illustrated in FIG. 16, the nine items of black level modulation data are arranged such that a distance between two adjacent items of black level modulation data is always equal to $2^7$ except when the two adjacent items are lying on a diagonal line. Hence, when a given observed pixel belongs to a given sub-region <Rj> (j: 0, 1, 2, or 3) out of the four sub-regions <R0>, <R1>, <R2>, and <R3>, an interpolation operator 40 in FIG. 15 calculates modulation data Pout at a local location (x, y) of the given observed pixel based on the following equation (1), to output a calculation result Pout as the data MDLi (refer to FIG. 9) to the subtracter 29.

$$Pout=\frac{(128-y)}{128}\times\left(\frac{(128-x)}{128}\times L.U.+\frac{x}{128}\times R.U.\right)+\frac{y}{128}\times\left(\frac{(128-x)}{128}\times L.Low.+\frac{x}{128}\times R.Low.\right)\quad\text{equation (1)}$$

During the calculation of the modulation data Pout, the interpolation operator 40 does divisions included in the above equation (1) by shifting. Hence, a troublesome increase in a circuit scale which is likely to be caused in doing divisions in an LSI can be avoided. As a result of the calculation and the output of the interpolation operator 40, an offset value of a black level signal at the local pixel location (x, y) is removed or reduced.

Alternatively, in a case where the modulation range in FIG. 16 is set to be divided into sixteen sections, a composite signal obtained by combining a 2-bit signal formed of the most significant bit AHC(7) and the second most significant bit AHC(6) of the output signal AHC and a 2-bit signal formed of the most significant bit AVC(7) and the second most significant bit AVC(6) of the output signal AVC is employed as the selection signal of each of the selectors 36, 37, 38, and 39.

In a case where the CPU (not illustrated) controls the selection signals SELH and SELV such that the selectors 34 and 35 select the signal HCNT[11:3] and the signal VCNT[11:3], respectively, in the circuit in FIG. 15, a smaller modulation range corresponding to a quarter of a first modulation range <R> (the modulation range illustrated in FIG. 16) is provided as the second modulation range <R0A> as illustrated in FIG. 17. Alternatively, in a case where the CPU (not illustrated) controls the selection signals SELH and SELV such that the selectors 34 and 35 select the signal HCNT[10:2] and the signal VCNT[10:2], respectively, in the circuit in FIG. 15, a much smaller modulation range corresponding to a quarter of the second modulation range <R0A> is provided as the third modulation range <R0AA> as illustrated in FIG. 17. Then, by further separating each of the count values HCNT[12:0] and VCNT[12:0], it is possible to achieve a modulation range which is physically even much smaller. Otherwise, by increasing the number of bits of each of the signals provided as a result of separation of each of the count values HCNT[12:0] and VCNT[12:0], it is possible to achieve a modulation range which is physically larger than the first modulation range <R> illustrated in FIG. 17. In this manner, a physical area of a modulation range can be changed by appropriately choosing the high-order bits of the count values HCNT[12:0] and VCNT[12:0] depending on a dimension or a size of the effective pixel region EPR of the image sensor IS being employed.

<Two-Dimensional Modulation of Gain for White Balance Control>

As described above, under the influence of miniaturization of the image sensor IS which is caused by an increase in the number of pixels, drift occurs in correction data also for white balance control all over an image plane of the image sensor IS. To overcome this disadvantage, a solution described in the paragraphs entitled "Two-dimensional Modulation of Black Level" is fully employed for white balance control data. More specifically, a white balance controller 14Ci (i: 0, 1, 2, or 3) (refer to FIG. 2) in each of the input channels modulates the white balance control data which is constant and is adapted to a color associated with an input image signal in accordance with a location of a pixel corresponding to the input image signal, and multiplies the input image signal by the modulated data.

More specifically, the white balance controller holds a plurality of items of white balance modulation data which are discretely placed in position coordinates defined by the horizontal counter 1 and the vertical counter 2, and calculates modulation data at a location of a pixel corresponding to an input image signal by carrying out interpolation using the plurality of items of white balance modulation data. For the interpolation, the white balance controller uses the plurality of items of white balance modulation data which are arranged such that a distance between two adjacent items of white balance modulation data is always equal to $2^n$ (n is a positive integer) except when the two adjacent items are lying on a diagonal line. More specifically, for the interpolation, the white balance controller selects high-order bits of each of the horizontal counter 1 and the vertical counter 2 to define a physical area of a modulation range, and adds an offset value which can take on a positive or negative value to an output value of each of the horizontal counter 1 and the vertical counter 2, independently. As a result, a center of the modulation range defined by the plurality of items of white balance modulation data matches a center of the effective pixel region EPR of the image sensor IS. Thereafter, substantial calculations for the interpolation are performed in the white balance controller.

A configuration of the white balance controller and the method for modulating the white balance control data are basically identical to the configuration and the operations of the modulation circuit for modulating the black level correction data, respectively, and thus, illustration therefor is omitted.

<Two-Dimensional Modulation of Gain for Tailing>

Figure 18A:
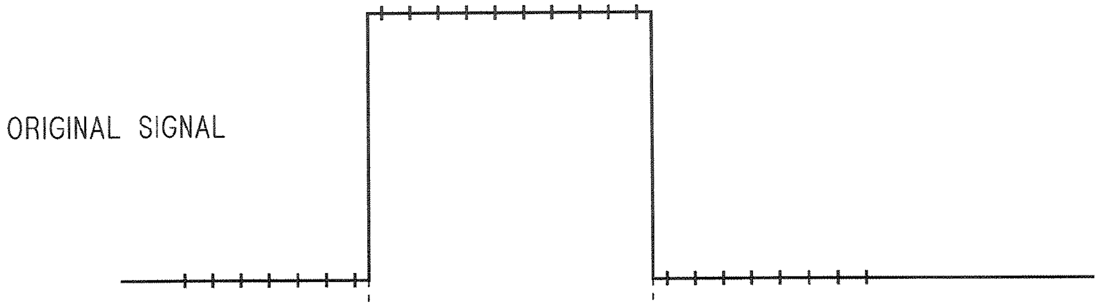
FIGS. 18A and 18B illustrate a method of correcting tailing.
Figure 18B:
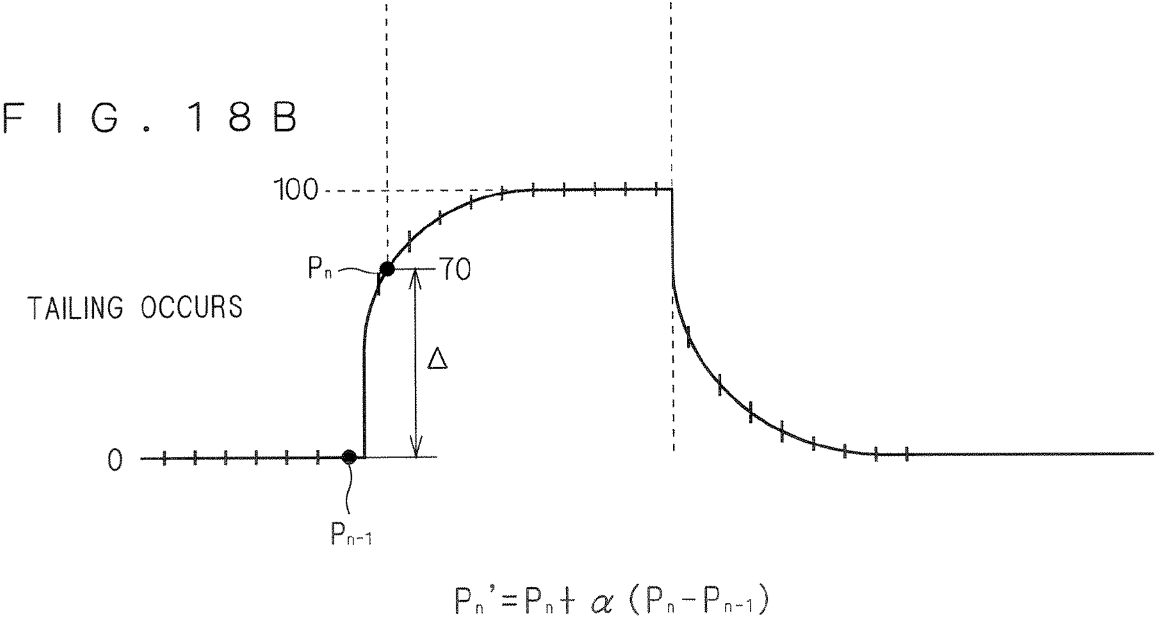

Because of degradation in characteristics which is caused along with an increase in the number of pixels of the image sensor IS, tailing occurs in a waveform of image data input to each of the SPU circuits SPU-Ci (i: 0, 1, 2, or 3) respectively for the plurality of readout channels of the SPU 100 (refer to FIG. 2), as illustrated in FIGS. 18A and 18B. For the purpose of correcting such dullness in a rise and a fall of a waveform, each of the SPU circuits SPU-Ci (i: 0, 1, 2, or 3) respectively for the plurality of readout channels includes a tailing corrector (refer to FIG. 22 for illustrating an example of packaging which will be later described). The tailing corrector multiplies a differential signal ($P_{n-1}-P_n$) corresponding to a difference between an image signal $P_n$ of a given observed pixel and another image signal $P_{n-1}$ of a pixel which is placed in the neighborhood of the given observed pixel and provides the same color as the given observed pixel, by a tailing correction gain α which is constant, to produce a tailing correction value α Δ, at each of the pixel clocks CLK. Then, the tailing corrector accomplishes tailing correction by adding the tailing correction value α Δ to the image signal (data) $P_n$ which is received, at each of the pixel clocks CLK (refer to FIGS. 18A and 18B). However, drift occurs also in the tailing correction gain α which is used for the foregoing tailing correction all over an image plane of the image sensor under the influence of miniaturization, in the same manner as in the black level correction data.

To overcome this disadvantage, according to the first preferred embodiment, a solution described in the paragraphs entitled "Two-dimensional Modulation of Black Level" is fully employed for the tailing correction gain α. More specifically, the tailing corrector modulates the tailing correction gain which is adapted to a color associated with an input image signal in accordance with a location of an observed pixel corresponding to the input image signal, and multiplies the differential signal by the modulated tailing correction gain to thereby obtain a tailing correction value.

More specifically, the tailing corrector holds a plurality of items of tailing correction gain modulation data which are discretely placed in position coordinates defined by the horizontal counter 1 and the vertical counter 2, and calculates modulated correction gain at a location of an observed pixel corresponding to an input image signal by carrying out interpolation using the plurality of items of tailing correction gain modulation data. Especially to allow divisions included in an arithmetic operation for the interpolation to be done by performing shifting in an LSI, the tailing corrector uses the plurality of items of tailing correction gain modulation data which are arranged such that a distance between two adjacent items of tailing correction gain modulation data is always equal to $2^n$ (n is a positive integer) except when the two adjacent items are lying on a diagonal line for the interpolation. More specifically, for the interpolation, the tailing corrector selects high-order bits of each of the horizontal counter 1 and the vertical counter 2 to define a physical area of a modulation range. Then, the tailing corrector adds an offset value which can take on a positive or negative value to an output value of each of the horizontal counter 1 and the vertical counter 2, independently, so that a center of the modulation range defined by the plurality of items of tailing correction gain modulation data matches a center of the effective pixel region EPR of the image sensor IS. Thereafter, substantial calculations for the interpolation are performed in the tailing corrector.

<Linearization>

An important point of the following operations is that different linearization characteristics are determined for colors, respectively, in each of the input channels, and linearization is accomplished by switching the different linearization characteristics in accordance with the color selection timing signal which has been described above. Below, specific operations for linearization will be described based on that point with reference to accompanying drawings.

As described above, we have been faced with a situation in which there is no choice but to use a portion with a relatively small level of characteristics of a semiconductor element forming each of pixels of an image sensor because of miniaturization of the images sensor for achieving an increase in the number of pixels of the image sensor. For this reason, a relationship between brightness of each of colors and an output value, which had conventionally linear characteristics, has non-linear characteristics nowadays.

Figures 19A, 19B, 19C:
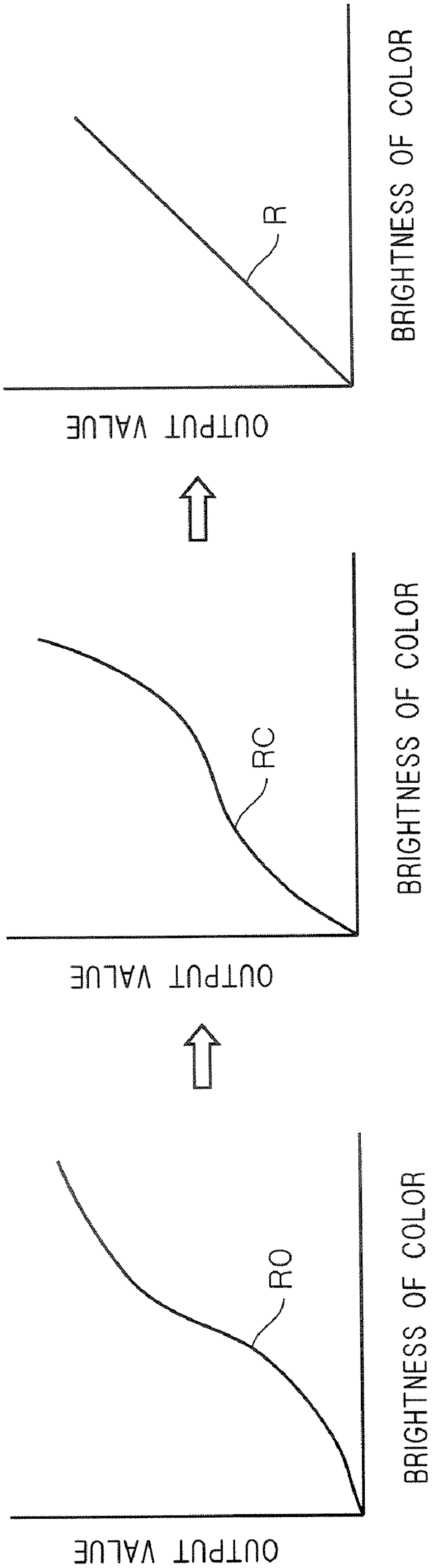
FIGS. 19A, 19B, and 19C illustrate a method of linearizing.

For example, as schematically shown in FIG. 19A, a relationship between brightness of R color and an output value has actually non-linear characteristics R0. A relationship between brightness of each of the other colors (Gr, Gb, and B) and an output value has likewise non-linear characteristics.

Thus, with respect to R color, for example, a curve RC indicating characteristics inverse to the characteristics R0 is defined as linearization characteristics as schematically illustrated in FIG. 19B. To employ the linearization characteristics RC defined in the foregoing manner as characteristics for correction causes the characteristics R0 and the characteristics RC to counterbalance each other, so that linear characteristics expressed by a straight line R in FIG. 19C can be obtained. In this embodiment, linearization is performed based on the above-mentioned principles. A specific circuit configuration is as follows.

Figure 21:
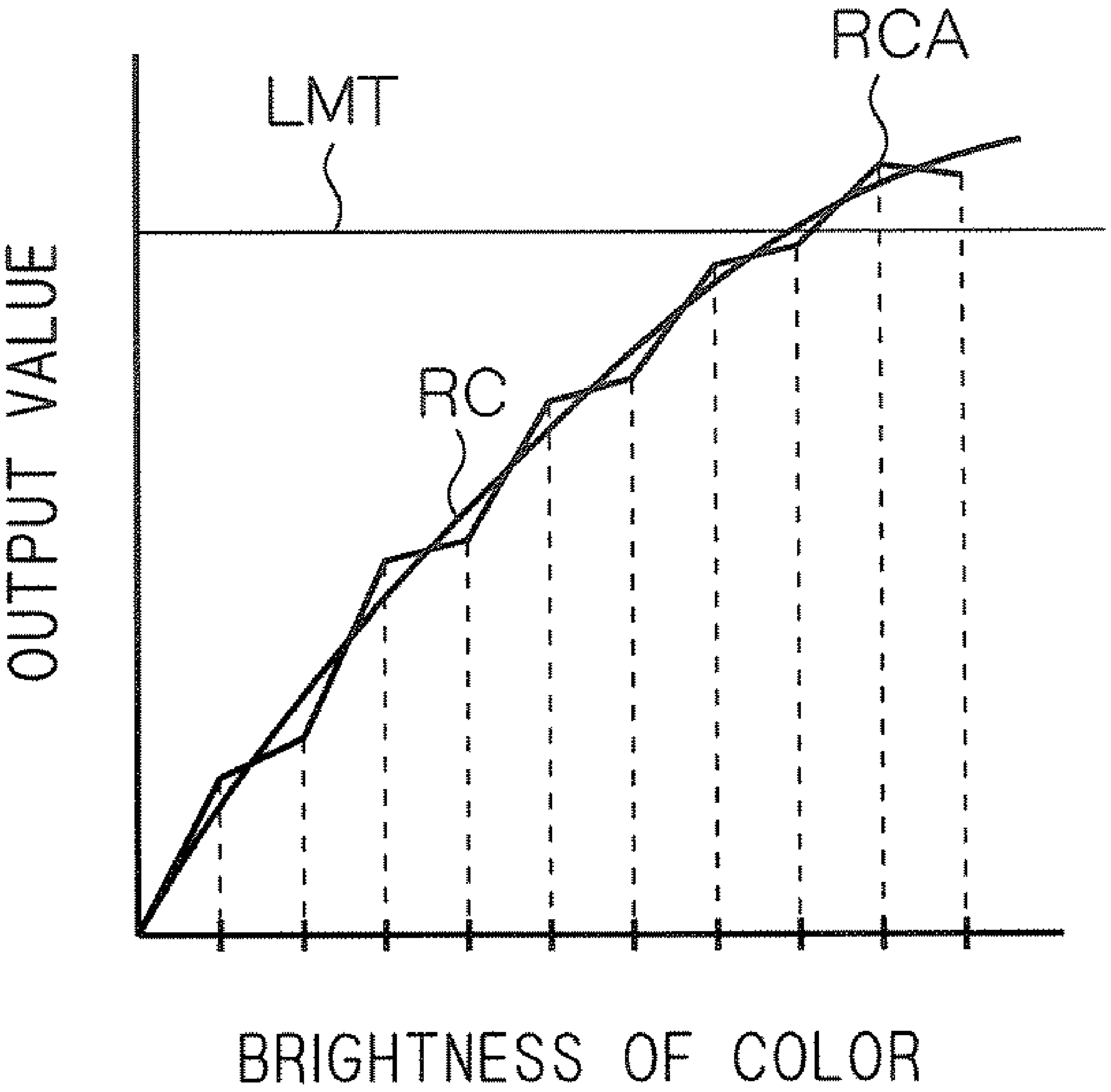
FIG. 21 illustrates a state in which linearization characteristics are divided by lines of a sequential line graph.

FIG. 20 is a block diagram illustrating elements of a circuit portion for performing linearization ("linearization circuit") which are included in the channel correction parts SPU-CX respectively for the plurality of input channels CHX (X: 0, 1, 2, and 3) (in other words, the circuit configuration illustrated in FIG. 20 is provided for each of the input channels CHX (X: 0, 1, 2, and 3)). A centerpiece of the linearization circuit in FIG. 20 is a linearization table register LTR. As illustrated in FIG. 20, the linearization table register LTR includes four linearization table registers of an R-color linearization table register 17, a Gr-color linearization table register 18, a Gb-color linearization table register 19, and a B-color linearization table register 20. For example, the R-color linearization table register 17 holds data for the linearization characteristics RC illustrated in FIG. 19B (which is previously written by the CPU (not illustrated)). Actually, the R-color linearization table register 17 holds the linearization characteristics RC, i.e., the curve RC, for correcting non-linear characteristics of a relationship between brightness of R color and an output value in the image sensor IS by being inverse to the non-linear characteristics. In the register 17, the linearization characteristics is held as thirty-three items of line data obtained by dividing the linearization characteristics RC by thirty-two straight lines in a sequential line graph as illustrated in FIG. 21, for example. The same holds true for each of the other linearization table registers 18, 19, and 20. Further, output data (a 16-bit signal) of each of the R-color, Gr-color, Gb-color, and B-color linearization table registers 17, 18, 19, and 20 is input to a first selector 21.

Basic operations of the first selector 21 is to receive the color selection timing signal CXCS (X: 0, 1, 2, or 3) for a given input channel out of the plurality of input channels CHX (CH0, CH1, CH2, and CH3) as a selection signal SEL1, and to select and output one of respective outputs of the linearization table registers 17, 18, 19, and 20 which is associated with the same color of a pixel designated by the color selection timing signal CXCS at a certain point in time. As a result, a linearization processor 26 corrects non-linearity of input image data CX Input (X: 0, 1, 2, or 3) using thirty-three data items for the linearization characteristics which are selected and output by the first selector 21 in accordance with the principles for correction which have been described above with reference to FIGS. 19A, 19B, and 19C. Thereafter, the linearization processor 26 outputs the input image data CX Input which has been corrected to have linearity, to the white balance controller (not illustrated).

By the above-described operations, it is possible to surely correct non-linear characteristics of a relationship between brightness of a color and an output value which is caused due to miniaturization of the image sensor IS for each of colors and for each of the input channels, whatever pattern may be employed for reading out image data from the image sensor IS.

Alternatively, a fixed linearization parameter register 15 and a second selector 16 may be included as additional elements as illustrated in FIG. 20. Such additional inclusion stems from a standpoint that non-linearity of image data input to each of the input channels is caused due to not only miniaturization of the image sensor IS, but also the other factors such as characteristics of an amplifier or the like provided on a side of the image sensor IS where the readout channels are provided. Especially when non-linearity is caused due to the other factors such as characteristics of circuitry or the like on an output side of the image sensor IS, the non-linearity differs from one readout channel to another readout channel. In view of this, the fixed linearization parameter register 15 stores values each of which designates one of the characteristics which is held in any of the four linearization table registers 17, 18, 19, and 20 as linearization characteristics for correcting non-linearity which is caused due to the other factors than miniaturization of the image sensor IS for one concerned out of the input channels. The values stored in the fixed linearization parameter register 15 serves as values unique to the four input channels CH0, CH1, CH2, and CH3, respectively, and are previously stored by the CPU (not illustrated). Then, to correct non-linearity caused due to miniaturization of the image sensor, the second selector 16 selects the color selection timing signal CXCS for one concerned out of the input channels in accordance with a level (designated value) of a selection signal SEL2 provided by the CPU (not illustrated) (so that linearization is performed in the above-described manner). On the other hand, to correct non-linearity caused due to characteristics of the elements placed on a path for readout, the selection signal SEL2 provided by the CPU (not illustrated) gives instructions to select an output value of the fixed linearization parameter register 15. As a result, the output value (parameter) of the fixed linearization parameter register 15 serves as the selection signal SEL1 of the first selector 21, so that an output of one of the linearization table registers 17, 18, 19, and 20 which is selected by the selection signal SEL1 and is associated with one concerned out of the input channels is input to the linearization processor 26. Then, the linearization processor 26 performs operations for correcting non-linearity caused due to the other factors than miniaturization of an image sensor.

As described above, each of the channel correction parts SPU-CX additionally includes: (1) the register 15 storing a fixed linearization parameter which designates one of outputs of the plural linearization table registers 17, 18, 19, and 20 as a particular output associated therewith; and (2) the second selector 16 for selecting and outputting either an output of the register 15 or the color selection timing signal CXCS associated therewith. This allows selective correction of not only non-linearity caused due to miniaturization of an image sensor, but also non-linearity caused due to the other factors such as characteristics of circuitry on an output side of the image sensor, for each of the input channels.

Further alternatively, a limiter part LMIP including limiter registers 22, 23, 24, and 25 respectively for the four colors and a third selector 27 may be included as a further additional element as illustrated in FIG. 20. Such additional inclusion is intended to terminate linearization when the level of input image data, or the output value of the curve RC is equal to or higher than a given limit value LMT. To this end, the limit value LMT serving as a limit for the linearization characteristics which are divided by thirty-two lines in a sequential line graph as illustrated in FIG. 21 (where the lines have the same horizontal pitch) is set. More specifically, as illustrated in FIG. 20, the four limiter registers 22, 23, 24, and 25 are provided to be adapted to the four colors, respectively, and each of the four limiter registers 22, 23, 24, and 25 holds, as a limit value, a certain level of a certain line out of the thirty-two lines in the sequential line graph by which the linearization characteristics for one concerned out of the four colors is divided. Then, the third selector 27 selects one out of respective outputs (limit values) of the four limiter registers 22, 23, 24, and 25 in accordance with an output value of the second selector 16, and outputs the selected limit value (16-bit signal) LMI to the linearization processor 26. As a result, the linearization processor 26 clips correction for the input image data CX Input when the level of the input image data CX Input is equal to or higher than the limit value LMI output from the third selector 27.

<Example of Packaging>

Figure 22:
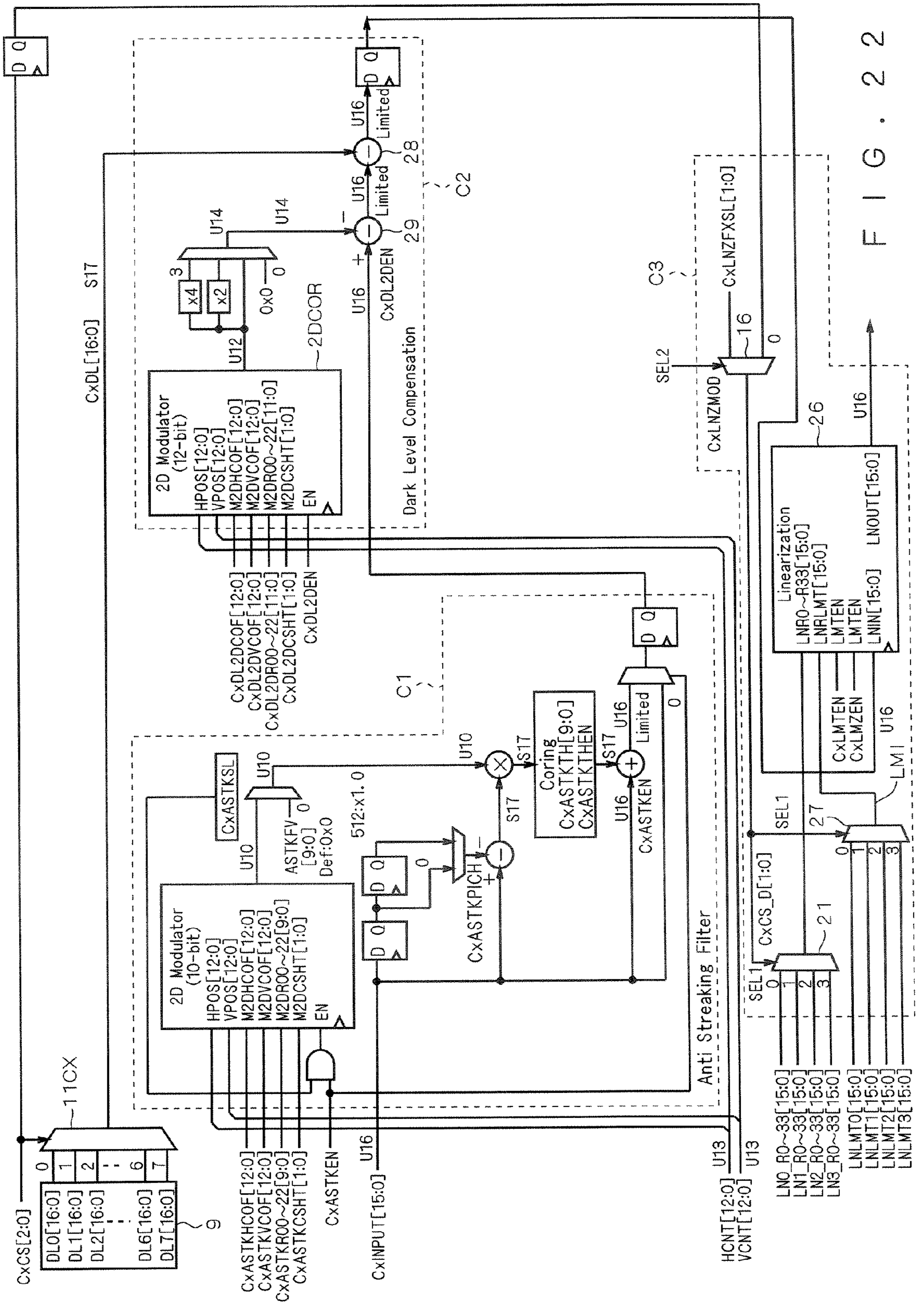
FIG. 22 is a block diagram illustrating an example of packaging of a principal portion of the SPU circuit for each of the input channels.

FIG. 22 is a block diagram illustrating an example of packaging of a principal portion of the SPU circuit SPU-CX (X: 0, 1, 2, or 3) for each of the readout channels. In FIG. 22, a circuit C1 in the first stage is the tailing corrector, a circuit C2 in a stage subsequent to the first stage is the black level corrector, and a circuit C3 in a stage subsequent to the stage of the circuit C2 is the linearization circuit. Further, the white balance corrector is provided in a stage subsequent to the stage of the circuit C3 though illustration thereof is not given.

The present invention is suitably applied to an LSI for a perfectly real-time pipelined image processor which performs image processing on a plurality of items of image data which are respectively read out via a plurality of readout channels included in an image sensor of a digital (still or video) camera, in parallel at each of pixel clocks without buffering the read image data in a high-capacity memory, for example.

While the invention has been shown and described in detail, the foregoing description is in all aspects illustrative and not restrictive. It is therefore understood that numerous modifications and variations can be devised without departing from the scope of the invention.

What is claimed is:

1. An image processor comprising:

an image sensor pre-processing unit including a plurality of channel correction parts arranged in parallel and configured to receive each of image signals which are read out in synchronization with one another via a plurality of respective image data readout channels included in an image sensor, respectively, using a plurality of input channels respectively connected with said plurality of image data readout channels, at each of pixel clocks, and perform predetermined image processing which is required due to a problem typical of said image sensor on input image data in parallel at each of said pixel clocks; and a color timing arrangement part configured to generate color selection timing signals which designate colors of pixels at a certain point in time respectively, individually, and exclusively for each of said plurality of input channels of said plurality of channel correction parts and output said color selection timing signals which are respectively and exclusively associated with said plurality of channel correction parts, to said plurality of channel correction parts, respectively, wherein each of said plurality of channel correction parts is configured to receive image data of various colors and performs said predetermined image processing in accordance with a color designated by one of said color selection timing signals which is associated therewith.

2. An image processor, comprising:

an image sensor pre-processing unit including a plurality of channel correction parts arranged in parallel and configured to receive each of image signals which are read out in synchronization with one another via a plurality of respective image data readout channels included in an image sensor, respectively, using a plurality of input channels respectively connected with said plurality of image data readout channels, at each of pixel clocks, and perform predetermined image processing which is required due to a problem typical of said image sensor on input image data in parallel at each of said pixel clocks; and a color timing arrangement part configured to generate color selection timing signals which designate colors of pixels at a certain point in time respectively, individually, for each of said plurality of input channels of said plurality of channel correction parts and output said color selection timing signals which are respectively associated with said plurality of channel correction parts, to said plurality of channel correction parts, respectively, wherein each of said plurality of channel correction parts performs said predetermined image processing in accordance with a color designated by one of said color selection timing signals which is associated therewith, wherein said color timing arrangement part comprises:

a color base timing signal generator which comprises a horizontal counter for making a timing for horizontal readout of pixels based on said pixel clocks and a vertical counter for making a timing for vertical readout of said pixels based on said pixel clocks, and combines a first low-order bit signal (equal to or more than one bit) including at least the least significant bit out of an output value of said horizontal counter and a second low-order bit signal (equal to or more than one bit) including at least the least significant bit out of an output value of said vertical counter, to thereby generate a color base timing signal whose repeat block is defined;

a plurality of timing registers provided respectively for said plurality of input channels, each of said plurality of timing registers comprising a plurality of registers storing data which provides a kind of a color associated with one concerned out of said plurality of input channels at each of locations in said repeat block of said color base timing signal; and a plurality of selectors for said timing registers which are provided for said plurality of input channels, respectively, each of said plurality of selectors receiving outputs of an associated one of said plurality of timing registers as an input, and selecting an output of an appropriate one of said registers included in said associated timing register in one concerned out of said plurality of input channels, as said color selection timing signal, in accordance with said color base timing signal.

3. The image processor according to claim 2, wherein said color base timing signal generator comprises:

a global horizontal counter for controlling said timing for horizontal readout of said pixels from said image sensor based on said pixel clocks;

a global vertical counter for controlling said timing for vertical readout of said pixels from said image sensor based on said pixel clocks and a horizontal reset signal output from a carry-out terminal of said global horizontal counter;

a local horizontal counter for determining a horizontal cycle of said repeat block of said color base timing signal to be a value ranging up to n bit (n>1), said local horizontal counter being reset in synchronization with reset of said global horizontal counter;

a local vertical counter for determining a vertical cycle of said repeat block of said color base timing signal to be a value ranging up to m bit (m>1), said local vertical counter being reset in synchronization with reset of said global vertical counter; and a selector for selectively combining a count value of said local horizontal counter and a count value of said local vertical counter, to generate said color base timing signal.

4. The image processor according to claim 2, wherein said color base timing signal generator generates said color base timing signal by selectively allocating said first low-order bit signal of said horizontal counter and said second low-order bit signal of said vertical counter to define said repeat block.

5. The image processor according to claim 4, wherein said color base timing signal generator generates said color base timing signal by selectively allocating one of a combination of low-order two bits of said horizontal counter and low-order two bits of said vertical counter, a combination of low-order three bits of said horizontal counter and the least significant bit of said vertical counter, and a combination of the least significant bit of said horizontal counter and low-order three bits of said vertical counter.

6. An image processor, comprising:

an image sensor pre-processing unit including a plurality of channel correction parts arranged in parallel and configured to receive each of image signals which are read out in synchronization with one another via a plurality of respective image data readout channels included in an image sensor, respectively, using a plurality of input channels respectively connected with said plurality of image data readout channels, at each of pixel clocks, and perform predetermined image processing which is required due to a problem typical of said image sensor on input image data in parallel at each of said pixel clocks; and a color timing arrangement part configured to generate color selection timing signals which designate colors of pixels at a certain point in time respectively, individually, for each of said plurality of input channels of said plurality of channel correction parts and output said color selection timing signals which are respectively associated with said plurality of channel correction parts, to said plurality of channel correction parts, respectively, wherein each of said plurality of channel correction parts performs said predetermined image processing in accordance with a color designated by one of said color selection timing signals which is associated therewith, and further comprising a correction data register configured to store correction data for each of colors, which data is required for performing said predetermined image processing and is used in common by said plurality of input channels, each of outputs of said correction data register being input to each of said plurality of image sensor pre-processing units, wherein each of said plurality of channel correction parts comprises:

a selector for selecting and outputting one of said outputs of said correction data register in accordance with one of said color selection timing signals which is associated therewith; and an image processing circuit for performing said predetermined image processing on said input image data using said correction data which is selected and output by said selector.

7. An image processor, comprising:

an image sensor pre-processing unit including a plurality of channel correction parts arranged in parallel and configured to receive each of image signals which are read out in synchronization with one another via a plurality of respective image data readout channels included in an image sensor, respectively, using a plurality of input channels respectively connected with said plurality of image data readout channels, at each of pixel clocks, and perform predetermined image processing which is required due to a problem typical of said image sensor on input image data in parallel at each of said pixel clocks; and a color timing arrangement part configured to generate color selection timing signals which designate colors of pixels at a certain point in time respectively, individually, for each of said plurality of input channels of said plurality of channel correction parts and output said color selection timing signals which are respectively associated with said plurality of channel correction parts, to said plurality of channel correction parts, respectively, wherein each of said plurality of channel correction parts performs said predetermined image processing in accordance with a color designated by one of said color selection timing signals which is associated therewith, wherein each of said plurality of channel correction parts comprises:

a plurality of linearization table registers provided respectively for colors, each Of which includes linearization characteristics for correcting non-linearity of a relationship between brightness of each of said colors and an output value, for each of said colors;

a first selector for selecting an output of one of said plurality of linearization table registers in accordance with one of said color selection timing signals which is associated with one concerned out of said plurality of image sensor pre-processing units; and a linearization processor for correcting non-linearity of said input image data using said linearization characteristics selected and output by said first selector.

8. The image processor according to claim 7, wherein each of said plurality of channel correction parts further comprises:

a register including a fixed linearization parameter which designates one of respective outputs of said plurality of linearization table registers which is associated with one concerned out of said plurality of image sensor pre-processing units, as a specific output; and a second selector for selecting and outputting either an output of said register or one of said color selection timing signals which is associated with one concerned out of said plurality of image sensor pre-processing units, wherein said first selector selects one of said respective outputs of said plurality of linearization table registers in accordance with an output value of said second selector.

9. The image processor according to claim 8, wherein said linearization characteristics included in each of said plurality of linearization table registers respectively included in said plurality of image sensor pre-processing units is formed of a plurality of lines in a sequential line graph, each of said plurality of channel correction parts further comprises:

a plurality of limiter registers respectively provided for said colors, each of which includes, as a limit value, a level of a certain line out of said plurality of lines which is associated with a certain color, for each of said colors; and a third selector for selecting one of respective outputs of said plurality of limiter registers in accordance with said output value of said second selector, and said linearization processor clips correction when a level of said input image data is equal to or higher than said limit value which is provided as an output of said third selector.

10. An image processor comprising:

an image sensor preprocessing unit which receives an image signal read out from an image sensor at each of pixel clocks and includes a black level corrector configured to perform black level correction on input image data at each of said pixel clocks in order to normalize said image signal; and a horizontal counter and a vertical counter for defining a location of each of pixels of said image sensor, wherein said black level corrector modulates black level correction data which is constant and is adapted to a color associated with said image signal in accordance with said location of one pixel out of said pixels which corresponds to said image signal, and subtracts said black level correction data as modulated, from said image signal.

11. The image processor according to claim 10, wherein said black level corrector includes a plurality of items of black level modulation data which are discretely placed in position coordinates defined by said horizontal counter and said vertical counter, and calculates modulation data at said location of said one pixel which corresponds to said image signal, by interpolation using said plurality of items of black level modulation data.

12. The image processor according to claim 11, wherein said black level corrector carries out said interpolation using said plurality of items of black level modulation data which are arranged such that a distance between two adjacent items of black level modulation data is always equal to $2^n$ (n is a natural number) except when said two adjacent items are lying on a diagonal line.

13. The image processor according to claim 12, wherein said black level corrector selects high-order bits of each of said horizontal counter and said vertical counter, said high-order bits defining a physical area of a modulation range.

14. The image processor according to claim 12, wherein said black level corrector adds an offset value which can take on a positive or negative value to an output value of each of said horizontal counter and said vertical counter, independently, to thereby allow a center of a modulation range defined by said plurality of items of black level modulation data and a center of an effective pixel region of said image sensor to match with each other, and thereafter, performs an operation for said interpolation.

15. The image processor according to claim 13, wherein said black level corrector adds an offset value which can take on a positive or negative value to an output value of each of said horizontal counter and said vertical counter, independently, to thereby allow a center of a modulation range defined by said plurality of items of black level modulation data and a center of an effective pixel region of said image sensor to match with each other, and thereafter, performs an operation for said interpolation.

16. An image processor comprising:

an image sensor pre-processing unit which receives an image signal read out from an image sensor at each of pixel clocks and includes a white balance corrector configured to perform white balance correction on input image data at each of said pixel clocks in order to normalize said image signal; and a horizontal counter and a vertical counter for defining a location of each of pixels of said image sensor, wherein said white balance corrector modulates white balance correction data which is constant and is adapted to a color associated with said image signal in accordance with said location of one pixel out of said pixels which corresponds to said image signal, and multiplies said image signal by said white balance correction data as modulated.

17. The image processor according to claim 16, wherein said white balance corrector includes a plurality of items of white balance modulation data which are discretely placed in position coordinates defined by said horizontal counter and said vertical counter, and calculates modulation data at said location of said one pixel which corresponds to said image signal, by interpolation using said plurality of items of white balance modulation data.

18. The image processor according to claim 17, wherein said white balance corrector carries out said interpolation using said plurality of items of white balance modulation data which are arranged such that a distance between two adjacent items of white balance modulation data is always equal to $2^n$ (n is a natural number) except when said two adjacent items are lying on a diagonal line.

19. The image processor according to claim 18, wherein said white balance corrector selects high-order bits of each of said horizontal counter and said vertical counter, said high-order bits defining a physical area of a modulation range.

20. The image processor according to claim 18, wherein said white balance corrector adds an offset value which can take on a positive or negative value to an output value of each of said horizontal counter and said vertical counter, independently, to thereby allow a center of a modulation range defined by said plurality of items of white balance modulation data and a center of an effective pixel region of said image sensor to match with each other, and thereafter, performs an operation for said interpolation.

21. The image processor according to claim 19, wherein said white balance corrector adds an offset value which can take on a positive or negative value to an output value of each of said horizontal counter and said vertical counter, independently, to thereby allow a center of a modulation range defined by said plurality of items of white balance modulation data and a center of an effective pixel region of said image sensor to match with each other, and thereafter, performs an operation for said interpolation.

22. An image processor comprising:

an image sensor pre-processing unit which receives an image signal read out from an image sensor at each of pixel clocks and includes a tailing corrector configured to perform tailing correction, in which a tailing correction value obtained by multiplying a difference signal corresponding a difference between said image signal and an image signal of one of pixels which is placed in the neighborhood of an observed pixel corresponding to said image signal and provides the same color as said observed pixel, by a constant tailing correction gain, is added to input image data, at each of said pixel clocks; and a horizontal counter and a vertical counter for defining a location of each of said pixels of said image sensor, wherein said tailing corrector modulates said tailing correction gain which is adapted to a color associated with said image signal in accordance with said location of said observed pixel out of said pixels which corresponds to said image signal, and multiplies said difference signal by said tailing correction gain as modulated, to thereby obtain said tailing correction value.

23. The image processor according to claim 22, wherein said tailing corrector includes a plurality of items of tailing correction gain modulation data which are discretely placed in position coordinates defined by said horizontal counter and said vertical counter, and calculates said tailing correction gain as modulated at said location of said observed pixel which corresponds to said image signal, by interpolation using said plurality of items of tailing correction gain modulation data.

24. The image processor according to claim 23, wherein said tailing corrector carries out said interpolation using said plurality of items of tailing correction gain modulation data which are arranged such that a distance between two adjacent items of tailing correction gain modulation data is always equal to $2^n$ (n is a natural number) except when said two adjacent items are lying on a diagonal line.

25. The image processor according to claim 24, wherein said tailing corrector selects high-order bits of each of said horizontal counter and said vertical counter, said high-order bits defining a physical area of a modulation range.

26. The image processor according to claim 24, wherein said tailing corrector adds an offset value which can take on a positive or negative value to an output value of each of said horizontal counter and said vertical counter, independently, to thereby allow a center of a modulation range defined by said plurality of items of tailing correction gain modulation data and a center of an effective pixel region of said image sensor to match with each other, and thereafter, performs an operation for said interpolation.

27. The image processor according to claim 25, wherein said tailing corrector adds an offset value which can take on a positive or negative value to an output value of each of said horizontal counter and said vertical counter, independently, to thereby allow a center of a modulation range defined by said plurality of items of tailing correction gain modulation data and a center of an effective pixel region of said image sensor to match with each other, and thereafter, performs an operation for said interpolation.

* * * * *